(12) United States Patent
Forrest

(10) Patent No.: US 9,771,706 B2
(45) Date of Patent: *Sep. 26, 2017

(54) RAINWATER COLLECTION, STORAGE, AND DISTRIBUTION SYSTEM

(75) Inventor: Paul Bradley Forrest, Cary, NC (US)

(73) Assignee: Rainflex, LLC, Cary, NC (US)

( * ) Notice: Subject to any disclaimer, the term of this patent is extended or adjusted under 35 U.S.C. 154(b) by 814 days.

This patent is subject to a terminal disclaimer.

(21) Appl. No.: 14/110,383

(22) PCT Filed: May 4, 2012

(86) PCT No.: PCT/US2012/036674
§ 371 (c)(1),
(2), (4) Date: Nov. 17, 2013

(87) PCT Pub. No.: WO2012/151557
PCT Pub. Date: Nov. 8, 2012

(65) Prior Publication Data
US 2014/0083021 A1    Mar. 27, 2014

Related U.S. Application Data

(63) Continuation of application No. 13/101,123, filed on May 4, 2011, now Pat. No. 8,496,810.

(51) Int. Cl.
*E03B 3/03* (2006.01)
*E04D 13/08* (2006.01)

(52) U.S. Cl.
CPC .............. *E03B 3/03* (2013.01); *E04D 13/08* (2013.01); *E04D 2013/0806* (2013.01); *Y10T 137/6969* (2015.04)

(58) Field of Classification Search
None
See application file for complete search history.

(56) References Cited

U.S. PATENT DOCUMENTS

| 226 A | 6/1837 | Goss |
| 8,727 A | 2/1852 | Swett |
| 16,906 A | 3/1857 | Baker |
| 18,929 A | 12/1857 | Robinson |
| 21,236 A | 8/1858 | Nutz |
| 22,655 A | 1/1859 | Ketchum |
| 24,238 A | 5/1859 | Ripley |

(Continued)

FOREIGN PATENT DOCUMENTS

| GB | 2307267 A | 5/1997 |
| RU | 79124 U1 | 12/2008 |
| RU | 2347871 C2 | 2/2009 |

OTHER PUBLICATIONS

International Search Report and Written Opinion dated Jul. 26, 2012 for corresponding application PCT/US2012/036674 filed May 4, 2012.

(Continued)

*Primary Examiner* — Robert James Popovics
(74) *Attorney, Agent, or Firm* — NK Patent Law, PLLC

(57) ABSTRACT

One or more devices for being received within a downspout of a rain gutter assembly are provided. The one or more devices may be provided for collecting rainwater flowing through the gutter assembly. One or more collection tanks for storing collected rainwater are also provided. One or more accessory devices for use with the one or more collector devices and the one or more storage tanks are also provided.

15 Claims, 27 Drawing Sheets

(56) References Cited

U.S. PATENT DOCUMENTS

| | | |
|---|---|---|
| 25,313 A | 9/1859 | Baker |
| 28,514 A | 5/1860 | Spiller |
| 34,927 A | 4/1862 | Wilcox |
| 35,545 A | 6/1862 | Ruth |
| 37,962 A | 3/1863 | Hicks |
| 45,228 A | 11/1864 | Curtis |
| 50,720 A | 10/1865 | Knowlton |
| 51,540 A | 12/1865 | Barker |
| 56,922 A | 8/1866 | Goulding |
| 57,944 A | 9/1866 | McInnes |
| 64,782 A | 5/1867 | McDonald |
| 65,072 A | 5/1867 | Greenleaf |
| 65,504 A | 6/1867 | Pryor |
| 72,469 A | 12/1867 | Ellis et al. |
| 81,926 A | 9/1868 | Meriman |
| 85,226 A | 12/1868 | Golder |
| 92,372 A | 7/1869 | Scharff |
| 92,667 A | 7/1869 | Stewart |
| 97,961 A | 12/1869 | Preston |
| 108,265 A | 10/1870 | Holman |
| 108,586 A | 10/1870 | Glover |
| 114,655 A | 5/1871 | Dubrul |
| 116,355 A | 6/1871 | Roden |
| 116,358 A | 6/1871 | Seaman |
| 118,402 A | 8/1871 | Stelle |
| 118,405 A | 8/1871 | Tucker |
| 128,030 A | 6/1872 | Fitch |
| 133,090 A | 11/1872 | Frankfoder et al. |
| 139,177 A | 5/1873 | Moloney |
| 152,181 A | 1/1874 | Shriver |
| 149,188 A | 3/1874 | Blocher et al. |
| 149,467 A | 4/1874 | Gillham |
| 163,492 A | 5/1875 | Holmes |
| 166,275 A | 8/1875 | Hancock |
| 168,227 A | 9/1875 | Carpenter |
| 168,899 A | 10/1875 | Hayden |
| 169,320 A | 10/1875 | Warrington |
| 173,338 A | 2/1876 | Price |
| 175,668 A | 4/1876 | Cooper |
| 180,833 A | 8/1876 | Bogart |
| 188,172 A | 3/1877 | Moyer |
| 189,509 A | 4/1877 | Shirley |
| 190,412 A | 5/1877 | Brossel |
| 191,577 A | 6/1877 | Fisher |
| 193,046 A | 7/1877 | Smith |
| 193,052 A | 7/1877 | Stone |
| 194,094 A | 8/1877 | Johnson |
| 196,099 A | 10/1877 | Mihan |
| 199,574 A | 1/1878 | Richardson |
| 200,482 A | 2/1878 | Salisbury |
| 202,022 A | 4/1878 | Grove |
| 206,397 A | 7/1878 | Marx |
| 206,790 A | 8/1878 | Hoenshell |
| 208,489 A | 10/1878 | Otis |
| 212,051 A | 2/1879 | Plant |
| 213,119 A | 3/1879 | Maddox |
| 217,020 A | 7/1879 | Moreland |
| 218,828 A | 8/1879 | Orput |
| 222,981 A | 12/1879 | Binns, Jr. |
| 226,260 A | 4/1880 | Allen |
| 229,486 A | 6/1880 | Stokes |
| 229,673 A | 7/1880 | Coes |
| 230,337 A | 7/1880 | Reddick |
| 247,341 A | 9/1881 | Hall |
| 252,079 A | 1/1882 | Crosby |
| 255,868 A | 4/1882 | Johnson et al. |
| 256,983 A | 4/1882 | Davis |
| 260,149 A | 6/1882 | Arnold |
| 261,026 A | 7/1882 | Myers |
| 262,206 A | 8/1882 | Carr |
| 267,342 A | 11/1882 | Ham |
| 271,044 A | 1/1883 | Dolan |
| 272,064 A | 2/1883 | Koontz |
| 277,836 A | 5/1883 | Flammger et al. |
| 282,754 A | 8/1883 | Morton |
| 289,458 A | 12/1883 | Smith |
| 289,667 A | 12/1883 | Lee |
| 295,902 A | 4/1884 | Blumenthal |
| 316,184 A | 4/1885 | Sancan |
| 604,475 A | 5/1898 | De Laval |
| 605,738 A | 6/1898 | Moyet |
| 615,273 A | 12/1898 | Higdon |
| 617,431 A | 1/1899 | Young |
| 1,312,738 A | 8/1919 | Lear |
| 1,453,109 A | 4/1923 | Hathaway |
| 1,950,682 A | 3/1934 | Fordyce |
| 2,292,764 A | 8/1942 | Levering |
| 3,375,851 A | 4/1968 | Schif |
| 3,489,164 A | 1/1970 | Fujiwara |
| 3,911,954 A | 10/1975 | Johnson et al. |
| 4,428,394 A | 1/1984 | Wright |
| 4,632,342 A | 12/1986 | Skinner |
| 4,700,734 A | 10/1987 | McCauley |
| 4,934,404 A | 6/1990 | DeStefano |
| 5,114,594 A | 5/1992 | Rosebrock |
| 5,234,286 A | 8/1993 | Wagner |
| 5,239,794 A | 8/1993 | Klein |
| 5,287,986 A | 2/1994 | Frost |
| 5,301,474 A | 4/1994 | Carey |
| 5,302,283 A | 4/1994 | Meuche |
| 5,400,815 A | 3/1995 | Whitehill |
| 5,435,458 A | 7/1995 | Bishop |
| 5,452,743 A | 9/1995 | Rortvedt |
| 5,454,205 A | 10/1995 | Bol |
| 5,463,909 A | 11/1995 | Eldridge |
| 5,474,197 A | 12/1995 | Hillis et al. |
| 5,498,331 A | 3/1996 | Monteith |
| 5,522,427 A | 6/1996 | Johnson |
| 5,533,303 A | 7/1996 | Harvey |
| 5,549,817 A | 8/1996 | Horsley |
| 5,673,519 A | 10/1997 | McCaughan |
| 5,681,455 A | 10/1997 | Takai et al. |
| 5,725,760 A | 3/1998 | Monteith |
| 5,726,360 A | 3/1998 | Keefer |
| D393,693 S | 4/1998 | Schollen et al. |
| 5,735,085 A | 4/1998 | Denooy |
| 5,735,304 A | 4/1998 | Chumley |
| 5,753,115 A | 5/1998 | Monteith |
| 5,779,888 A | 7/1998 | Bennett |
| 5,843,306 A | 12/1998 | Singleton |
| 5,862,632 A | 1/1999 | Zima |
| 5,862,633 A | 1/1999 | Van Ells |
| 5,863,151 A | 1/1999 | Chapotelle |
| 5,873,383 A | 2/1999 | Takai |
| 5,878,907 A | 3/1999 | Graf |
| 5,980,736 A | 11/1999 | Putz et al. |
| 5,985,158 A | 11/1999 | Tiderington |
| 6,042,743 A | 3/2000 | Clemenson |
| 6,068,765 A | 5/2000 | Monteith |
| 6,073,583 A | 6/2000 | Cumming |
| 6,176,065 B1 | 1/2001 | Honda |
| 6,176,540 B1 | 1/2001 | Whittaker |
| 6,182,680 B1 | 2/2001 | Hart |
| 6,227,000 B1 | 5/2001 | Irei et al. |
| 6,240,680 B1 | 6/2001 | Estes |
| 6,244,968 B1 | 6/2001 | Arie |
| 6,264,832 B1 | 7/2001 | Panahi |
| 6,283,319 B1 | 9/2001 | Hillis et al. |
| 6,337,025 B1 | 1/2002 | Clemenson |
| 6,350,374 B1 | 2/2002 | Stever et al. |
| 6,382,237 B1 | 5/2002 | Takai |
| 6,395,390 B1 | 5/2002 | Inoue et al. |
| 6,397,526 B1 | 6/2002 | Saul et al. |
| 6,429,171 B1 | 8/2002 | Clemenson |
| 6,436,283 B1 | 8/2002 | Duke |
| 6,447,686 B1 | 9/2002 | Choi |
| 6,484,898 B2 | 11/2002 | Hillis et al. |
| 6,494,147 B1 | 12/2002 | Schulte et al. |
| 6,517,285 B2 | 2/2003 | Hill |
| 6,526,699 B1 | 3/2003 | Foglio, Sr. |
| 6,553,723 B1 | 4/2003 | Alcorn |
| 6,576,123 B2 | 6/2003 | Priggemeyer et al. |
| 6,588,825 B1 | 7/2003 | Wheatley |
| 6,619,312 B2 | 9/2003 | Doiron |

(56) References Cited

U.S. PATENT DOCUMENTS

| | | |
|---|---|---|
| 6,647,670 B1 | 11/2003 | Dran |
| 6,663,769 B2 | 12/2003 | Hosoya |
| D486,950 S | 2/2004 | Ruck |
| 6,701,675 B1 | 3/2004 | Ekker |
| 6,767,160 B2 | 7/2004 | Sansalone |
| 6,797,161 B2 | 9/2004 | Use |
| 6,818,127 B1 | 11/2004 | Ketrow |
| 6,820,375 B2 | 11/2004 | Meeker |
| 6,832,635 B2 | 12/2004 | Kruger |
| 6,854,925 B2 | 2/2005 | DiTullio |
| 6,889,395 B1 | 5/2005 | Hodges |
| 6,905,607 B2 | 6/2005 | Hosoya |
| 6,920,984 B2 | 7/2005 | Agnew |
| 6,929,395 B1 | 8/2005 | Metz |
| 6,936,163 B2 | 8/2005 | Use |
| 6,939,461 B2 | 9/2005 | Use |
| 6,941,702 B1 | 9/2005 | Abrams et al. |
| 6,962,464 B1 | 11/2005 | Chen |
| 6,964,135 B1 | 11/2005 | Slodov |
| 6,966,333 B1 | 11/2005 | Kuehneman |
| 6,991,402 B2 | 1/2006 | Burkhart |
| 6,991,734 B1 | 1/2006 | Smith |
| 6,994,783 B2 | 2/2006 | Use |
| D518,270 S | 3/2006 | Ayers |
| 7,011,743 B2 | 3/2006 | Use |
| 7,022,235 B2 | 4/2006 | Hassett |
| 7,022,243 B2 | 4/2006 | Bryant |
| 7,025,076 B2 | 4/2006 | Zimmerman et al. |
| 7,037,436 B2 | 5/2006 | Use et al. |
| 7,048,849 B2 | 5/2006 | Wade |
| 7,052,206 B1 | 5/2006 | Mastromonaco |
| 7,080,480 B2 | 7/2006 | Urban et al. |
| 7,108,794 B1 | 9/2006 | Coffey, Jr. |
| 7,121,589 B2 | 10/2006 | Hawkinson et al. |
| 7,128,832 B2 | 10/2006 | Wade |
| 7,147,777 B1 | 12/2006 | Porteous |
| 7,160,058 B2 | 1/2007 | Burkhart |
| 7,162,833 B2 | 1/2007 | Faris |
| 7,182,856 B2 | 2/2007 | Pank |
| 7,186,058 B2 | 3/2007 | Schluter et al. |
| 7,200,969 B2 | 4/2007 | Rotter |
| D542,885 S | 5/2007 | Knackstedt |
| 7,270,339 B2 | 9/2007 | Feick |
| 7,314,549 B2 | 1/2008 | Swift |
| 7,344,335 B2 | 3/2008 | Burkhart |
| 7,348,685 B2 | 3/2008 | Yi et al. |
| 7,395,633 B2 | 7/2008 | Baeta |
| D575,853 S | 8/2008 | Adamson |
| 7,422,683 B2 | 9/2008 | Park |
| 7,425,261 B2 | 9/2008 | Siviter et al. |
| 7,493,728 B2 | 2/2009 | Dussault |
| 7,543,493 B2 | 6/2009 | Geschwender |
| 7,544,288 B1 | 6/2009 | Cook |
| 7,550,077 B2 | 6/2009 | Graf |
| D596,372 S | 7/2009 | Lawrence |
| D599,975 S | 9/2009 | Magee |
| D600,328 S | 9/2009 | Lobban |
| D603,575 S | 11/2009 | Kerman et al. |
| D603,932 S | 11/2009 | Nattrass et al. |
| D605,375 S | 12/2009 | Anderson et al. |
| 7,625,485 B2 | 12/2009 | Siviter et al. |
| 7,632,403 B2 | 12/2009 | Dierkes |
| 7,637,691 B1 | 12/2009 | DiTullio |
| 7,640,792 B2 | 1/2010 | Watt |
| 7,666,303 B2 | 2/2010 | Williams et al. |
| 7,685,778 B2 | 3/2010 | Edell |
| 7,718,056 B2 | 5/2010 | Bonnerup |
| 7,721,491 B2 | 5/2010 | Appel |
| D617,430 S | 6/2010 | Lobban |
| D617,867 S | 6/2010 | May |
| D618,316 S | 6/2010 | Lobban |
| 7,726,906 B2 | 6/2010 | Essig, Jr. et al. |
| 7,735,668 B2 | 6/2010 | Richter |
| 7,775,232 B2 | 8/2010 | Takai |
| 7,779,855 B2 | 8/2010 | McAvoy et al. |
| 7,788,848 B1 | 9/2010 | Koumoudis |
| 7,798,747 B1 | 9/2010 | De Bruijn et al. |
| 7,806,627 B2 | 10/2010 | DiTullio |
| 7,807,052 B2 | 10/2010 | Milne |
| 8,033,058 B2 | 10/2011 | Block |
| 8,075,765 B2 | 12/2011 | Perlatti |
| 8,097,151 B2 | 1/2012 | Allan |
| 8,404,110 B2 | 3/2013 | Block |
| 2005/0016078 A1 | 1/2005 | Rotter |
| 2005/0257433 A1 | 11/2005 | Dussault et al. |
| 2006/0101723 A1 | 5/2006 | Baeta |
| 2007/0175106 A1 | 8/2007 | Rotter |
| 2009/0031625 A1 | 2/2009 | McAvoy et al. |
| 2010/0038300 A1 | 2/2010 | Allan |
| 2010/0193046 A1 | 8/2010 | Moroder et al. |
| 2010/0199574 A1 | 8/2010 | Perlatti |
| 2010/0200482 A1 | 8/2010 | Perlatti |
| 2010/0270219 A1 | 10/2010 | Block |
| 2011/0303307 A1 | 12/2011 | Block |
| 2012/0279583 A1 | 11/2012 | Forrest |

OTHER PUBLICATIONS

Notice of Allowance dated Jun. 21, 2013 for corresponding U.S. Appl. No. 13/101,123, filed May 4, 2011.

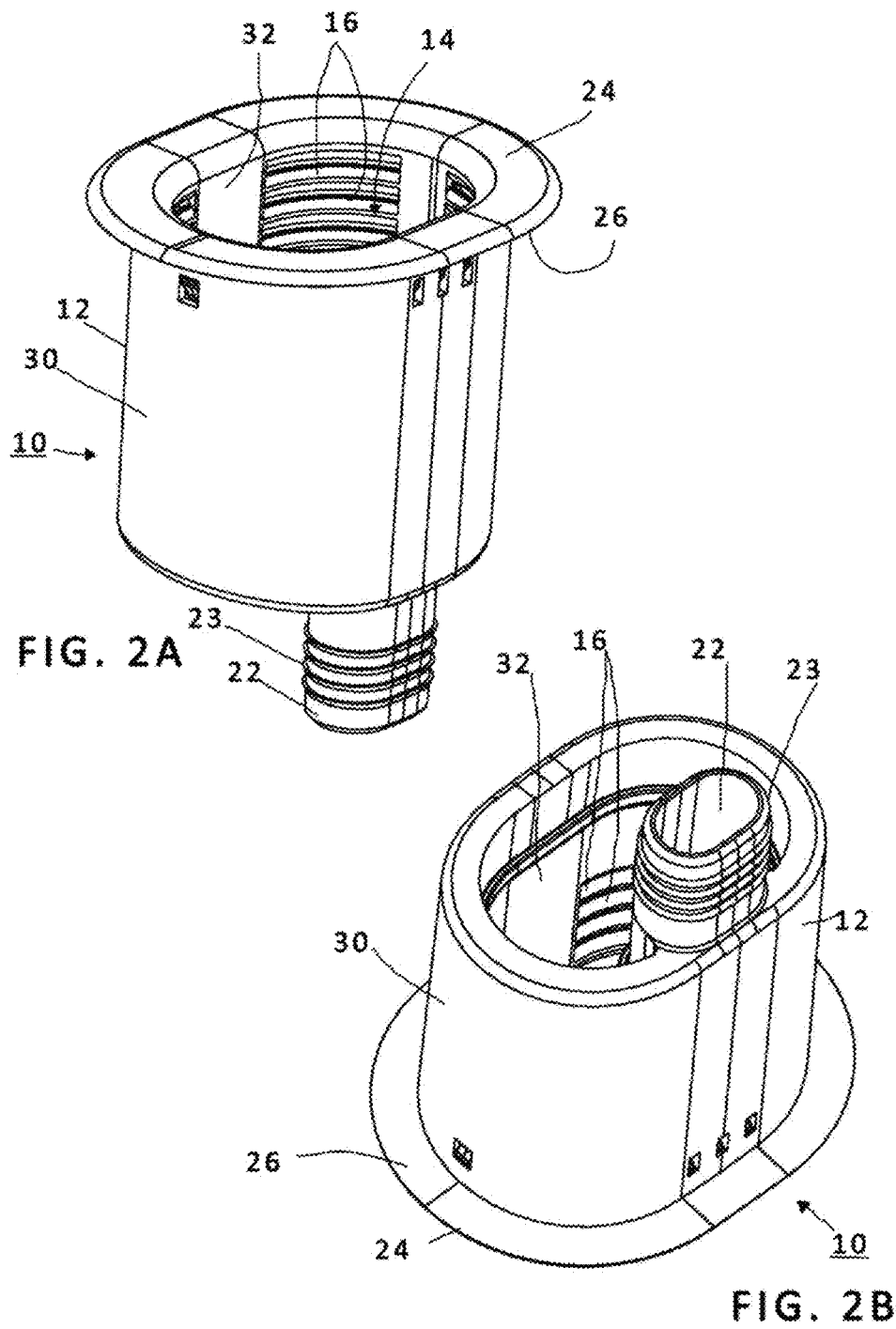

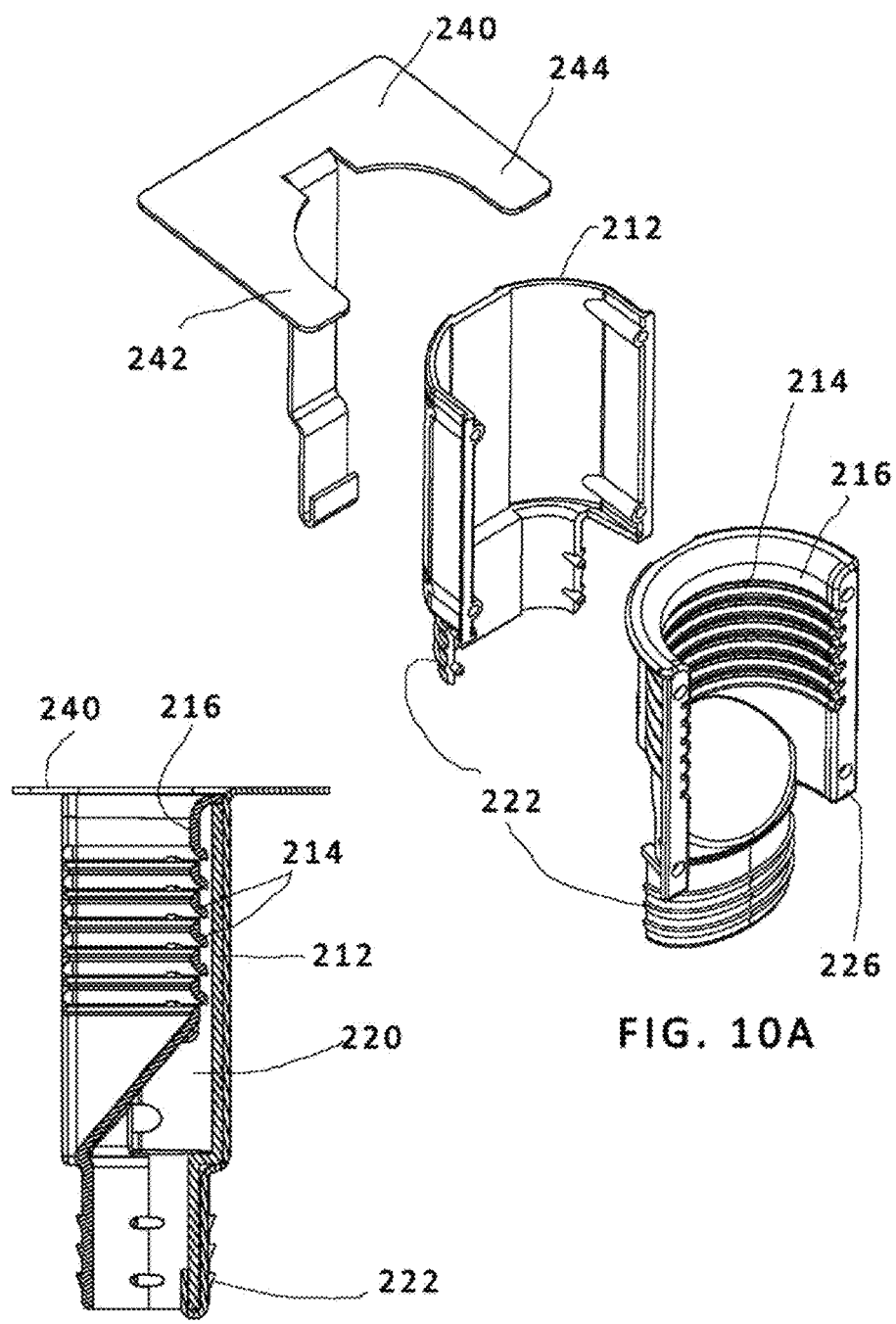

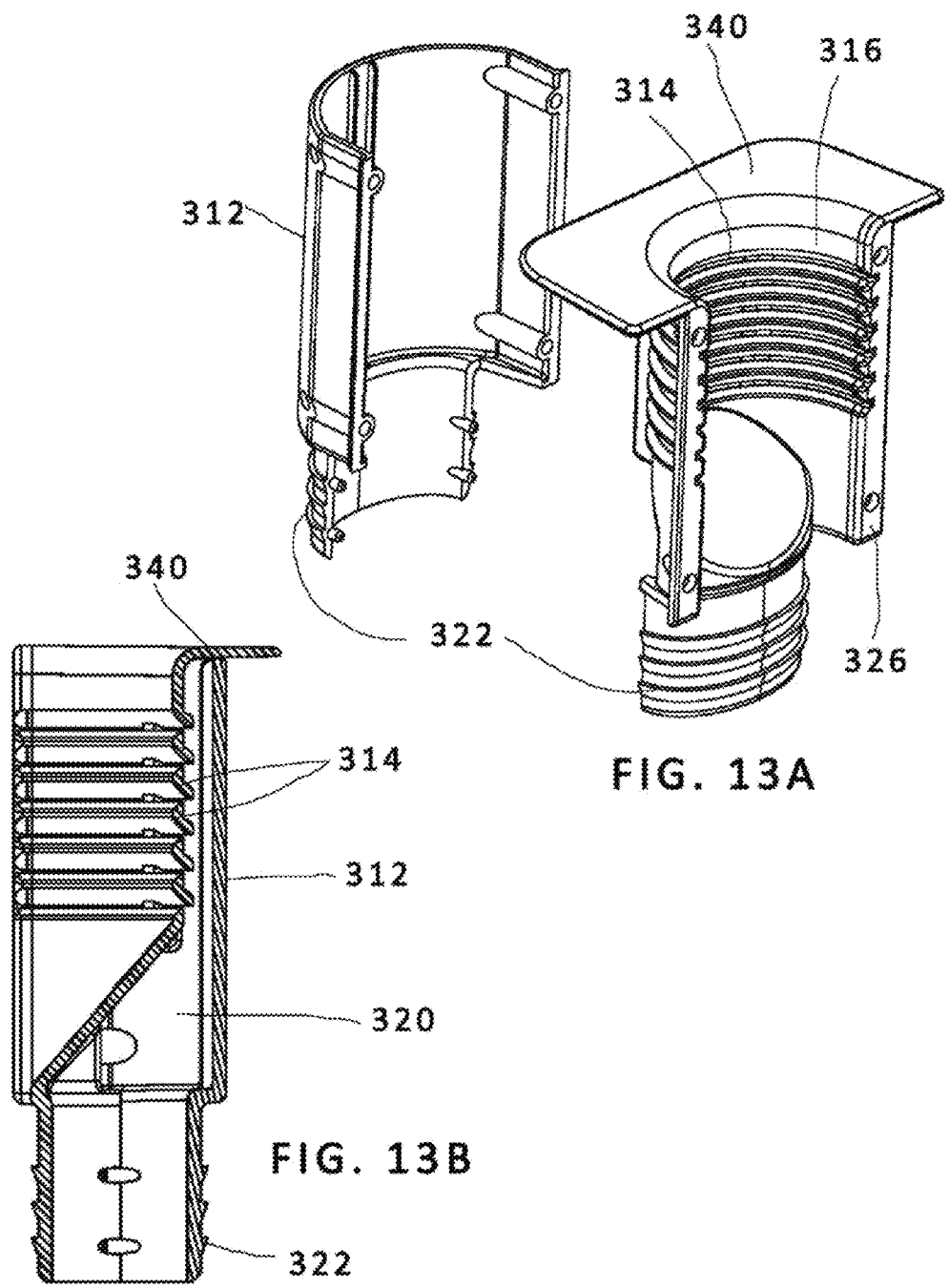

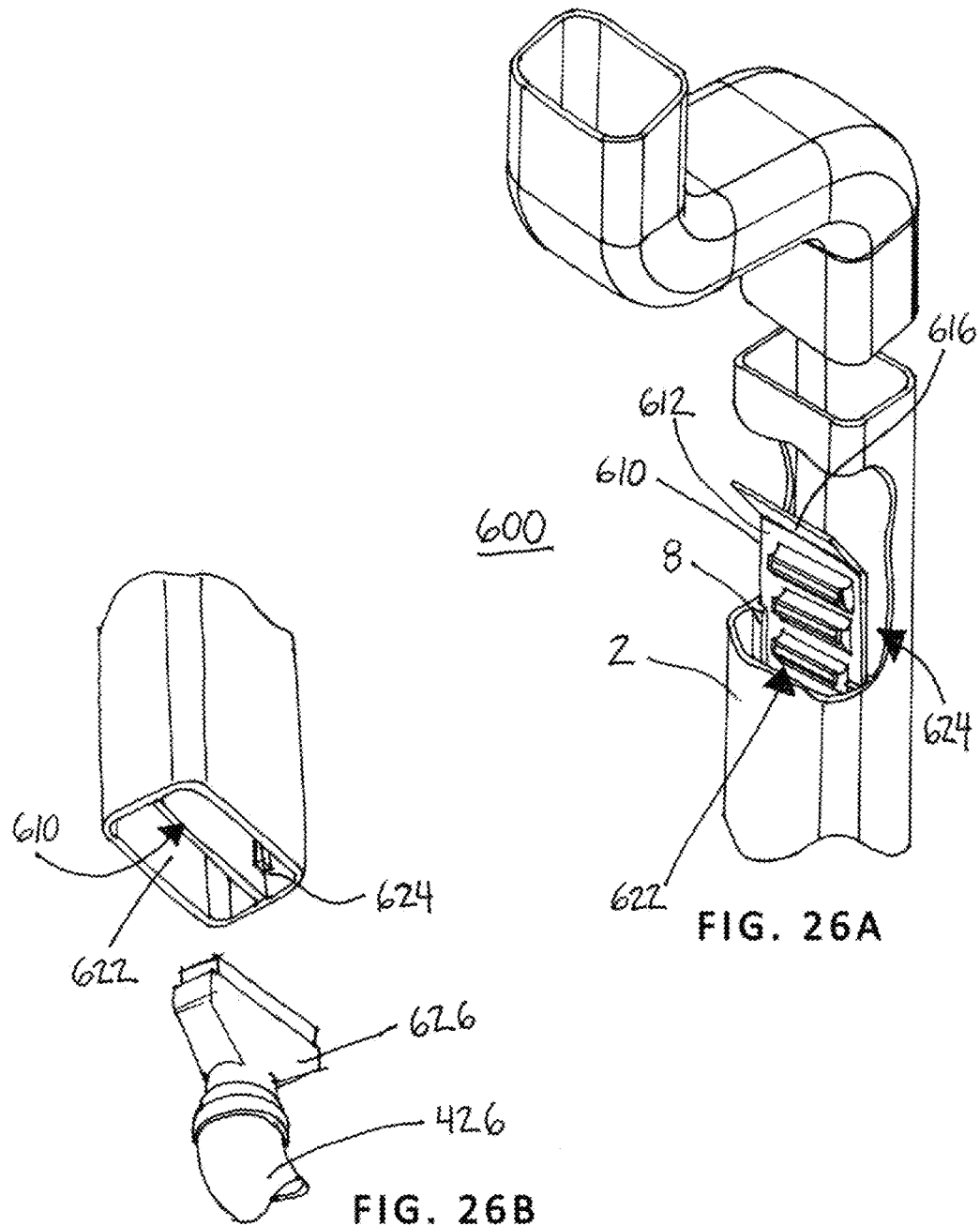

RAINWATER COLLECTION, STORAGE, AND DISTRIBUTION SYSTEM

CROSS-REFERENCE TO RELATED APPLICATIONS

This application claims priority to U.S. utility application Ser. No. 13/101,123, filed on May 4, 2011, now U.S. Pat. No. 8,496,810 and is a 371 National Stage application of US2012/036674, filed on May 4, 2012, the entire contents of which are hereby incorporated by reference.

TECHNICAL FIELD

The presently disclosed subject matter is directed towards a device for collecting rainwater from a gutter assembly, and, more particularly, towards a device for being received within a downspout of a gutter assembly and a bladder and pump assembly for use with the device.

BACKGROUND

Water conservation has become increasingly important due to limited water resources amid rising populations and increased demand for water. Efforts to reduce water consumption have had limited success.

Limited water resources have had an adverse impact on the ability of homeowners to water their lawns and gardens. Furthermore, governments and municipalities have limited the use of irrigation and lawn watering in times of drought and limited water supply. This is problematic in times of drought as homeowners may not be allowed to water their lawns that may already be suffering from the drought conditions. Repair of lawns that have suffered from drought conditions is expensive. Furthermore, drought-stricken lawns are unsightly and may impact the land value of a homeowner. Additionally, water tables around the world continue to be depleted faster than they are being replenished such that water conservation will continue to be a growing social initiative.

Drought-stricken lawns need water through either irrigation or natural precipitation such as rainfall. However, rainfall is unpredictable as far as occurrence and amounts. For best results in lawn maintenance or tending a garden, routine and regular irrigation and watering are needed.

One manner of providing irrigation and watering may include using a storage tank or rain barrel that is designed to collect rainwater coming through a gutter assembly. One manner of collecting rainwater from a gutter assembly may include cutting through an existing downspout assembly and attaching a device such as a fitting with a hose to the downspout assembly. However, this device may not be aesthetically pleasing or functional. Other devices may not be easily installed upon a gutter assembly. These devices may also clog easily or may have a debris filter that must be cleaned to function properly.

Another difficulty presented by existing rainwater collection systems is that the storage tank must be placed under the existing downspout which makes the tank conspicuous and difficult to conceal.

Still another disadvantage of existing systems is that those systems rely on gravity for evacuation of the collected water. For this reason, the collection point in which water is collected within the gutter assembly of certain systems is often raised off of the ground to increase pressure, thus making it even more difficult to conceal.

Accordingly, there remains a need for a device that addresses the various disadvantages associated with previous devices.

SUMMARY

According to one aspect of the disclosed subject matter, a device for being received within a downspout of a rain gutter assembly is provided. The downspout is of the type having an inlet at a top portion thereof and an outlet at a lowermost portion thereof. The device includes a housing defining a longitudinally extending passageway for allowing flow of uncollected water therethrough and at least one laterally extending collection aperture defined in a wall in the housing for allowing flow of collected water therethrough. A collection chamber is in communication with the at least one collection aperture for collecting water and a drain outlet is in communication with the chamber for allowing flow of collected water therethrough.

According to one aspect of the disclosed subject matter, the device includes a circumferentially extending shoulder at an upper portion of the housing for providing registration engagement on a bottom portion of the shoulder with an upper surface of the rain gutter assembly such that the housing is received in the uppermost opening in the downspout.

According to one aspect of the disclosed subject matter, the housing comprises an outer assembly and an inner assembly that are interconnected at a bottom portion thereof for forming the chamber.

According to one aspect of the disclosed subject matter, the shoulder is carried by the inner assembly.

According to one aspect of the disclosed subject matter, the at least one collection aperture is defined in a wall of the inner assembly.

According to one aspect of the disclosed subject matter, the device includes a drain line in communication with the drain outlet and a storage tank for storing collected water.

According to one aspect of the disclosed subject matter, the drain line is configured for extending from the chamber and exiting through the outlet at the lowermost portion of the downspout.

According to one aspect of the disclosed subject matter, the storage tank includes a flexible bladder.

According to one aspect of the disclosed subject matter, the storage tank includes a camouflaging pattern on surface of the tank.

According to one aspect of the disclosed subject matter, the storage tank includes rot resistant material on a bottom surface thereof and ultraviolet degradation protection on an upper surface thereof.

According to one aspect of the disclosed subject matter, the storage tank includes an inlet configured for maintaining an upper position thereof.

According to one aspect of the disclosed subject matter, a rain gutter system is provided. The rain gutter system includes a rain gutter assembly including a downspout of the type having an inlet at a top portion thereof and an outlet at a lowermost portion thereof. The rain gutter system includes a device for being received within the downspout. The device includes a housing defining a longitudinally extending passageway for allowing flow of uncollected water therethrough and at least one laterally extending collection aperture defined in a wall in the housing for allowing flow of collected water into a chamber that is in fluid communication therewith and is defined within the housing. A drain outlet is in communication with the chamber for allowing flow of collected water therethrough and a circumferentially extending shoulder is provided at an upper portion of the housing for providing registration engagement on a bottom portion of the shoulder with an upper surface of the rain gutter assembly such that the housing is received in the downspout According to one aspect of the disclosed subject matter, the storage tank includes a siphon pump assembly configured for siphoning collected rainwater from the storage tank.

According to one aspect of the disclosed subject matter, the storage tank is carried by a slideable mount configured for allowing slideable movement of the siphon pump assembly when the storage tank expands and contracts such that the drain line maintains a constant position relative to the water level in the storage tank.

According to one aspect of the disclosed subject matter, the siphon pump assembly includes a valve for preventing flow of water therethrough when the valve is in a closed position.

According to one aspect of the disclosed subject matter, the siphon pump assembly is configured for fluid engagement with a pumping source for providing pumping forces to pump stored water from the storage tank through the siphon pump assembly.

According to one aspect of the disclosed subject matter, the storage tank includes a flexible bladder and a siphon pump assembly carried thereby and is in communication with the drain line. The siphon pump assembly is configured for movement with the flexible bladder such that the drain line maintains a relatively constant position relative to the water level in the storage tank.

According to one aspect of the disclosed subject matter, the drain line is configured for extending from the chamber and exiting through the outlet at the lowermost portion of the downspout.

According to one aspect of the disclosed subject matter, each collection aperture defines a curved surface at an upper portion thereof for directing collected water into the collection chamber. The surface tension of the water flowing over the curved surface causes the water to flow into the collection chamber while gravity causes the debris to flow through the passageway.

According to one aspect of the disclosed subject matter, a device for cooperating with a downspout of a rain gutter assembly is provided. The downspout is of the type having an inlet at a top portion thereof and an outlet at a bottom portion thereof. The device includes a housing configured for being received in a first portion of the downspout inlet such that a second portion of the downspout inlet allows flow of uncollected water therethrough. The housing includes at least one collection aperture on a surface thereof for allowing flow of collected water therethrough and a collection chamber in communication with the collection aperture for containing the collected water. A drain outlet is in communication with the chamber for allowing flow of collected water therethrough and a shoulder is carried at an upper portion of the housing and spans at least a portion of an upper surface of the rain gutter assembly for providing registration engagement therewith.

According to one aspect of the disclosed subject matter, the shoulder comprises a support that spans about the inlet of the downspout.

According to one aspect of the disclosed subject matter, the device includes a drain line in communication with the drain outlet and a storage tank for storing collected water.

According to one aspect of the disclosed subject matter, the drain line is configured for extending from the chamber and exiting through the outlet at the lowermost portion of the downspout.

According to one aspect of the disclosed subject matter, a rain gutter system is provided. The rain gutter system includes a rain gutter assembly including a downspout of the type having an inlet at a top portion thereof and an outlet at a lowermost portion thereof and a device for cooperating with the downspout of a rain gutter assembly. The device includes a housing configured for being received in a first portion of the downspout inlet such that a second portion of the downspout inlet allows flow of uncollected water therethrough. The housing defines at least one collection aperture on a surface thereof for allowing flow of collected water therethrough, a collection chamber in communication with the collection aperture for containing the collected water, and a drain outlet in communication with the chamber for allowing flow of collected water therethrough. The device includes a shoulder carried at an upper portion of the housing and spanning at least a portion of an upper surface of the rain gutter assembly for providing registration engagement therewith.

According to one aspect of the disclosed subject matter, the shoulder includes a support that spans about the inlet of the downspout.

According to one aspect of the disclosed subject matter, a rainwater collection system for cooperating with a rain gutter assembly having a rain gutter downspout in communication therewith is provided. The system includes a device received in the inlet of the rain gutter downspout for collecting rainwater passing therethrough and a drain line in communication with the device and extending therefrom through the outlet of the rain gutter downspout for passing collected rainwater from the device through the outlet.

According to one aspect of the disclosed subject matter, a rain gutter system is provided. The rain gutter system includes a rain gutter assembly including a downspout of the type having an inlet at a top portion thereof and an outlet at a lowermost portion thereof and a rainwater collection device for being received within the downspout. The device is substantially received in the downspout and has a shoulder extending from an upper portion thereof for registration engagement with an upper surface of the rain gutter assembly.

According to one aspect of the disclosed subject matter, a drain line extends through the downspout and is in communication with the drain outlet and a storage tank for storing collected water. The drain line is sufficiently rigid to maintain the position of the device within the downspout.

According to one aspect of the disclosed subject matter, the collection device can be positioned within the downspout by insertion into a bottom opening and being translated by movement of the drain line.

According to one aspect of the disclosed subject matter, the at least one laterally extending collection aperture defines a ramp portion upstream thereof that angles away from the longitudinally extending wall toward the collection aperture for allowing water to follow the surface due to water tension whereby debris continues flowing through the downspout without entering the collection aperture.

According to one aspect of the disclosed subject matter, the collector device includes a drain line in sealed fluid communication with the drain outlet and a storage tank.

According to one aspect of the disclosed subject matter, the collector system further includes a siphoning device in sealed fluid communication with the storage tank for siphon pumping fluids therefrom.

According to one aspect of the disclosed subject matter, the collector system further includes a valve device being in sealed fluid communication with the pump, the storage tank, and an external water supply, the valve having one inlet for supplying pressurized external water supply, one inlet sealably connected to the storage tank, one outlet for the external water supply, and one outlet being configured as a selectively engageable valve for switching between the storage tank and the external water supply.

According to one aspect of the disclosed subject matter, the housing defines one or more sections flexibly connected to one another such that the device can be translated within non-linear portions of the downspout.

According to one aspect of the disclosed subject matter, the housing defines one or more sections pivotally connected to one another such that the device can be translated within non-linear portions of the downspout.

According to one aspect of the disclosed subject matter, the housing is flexible such that the device can be translated within non-linear portions of the downspout.

According to one aspect of the disclosed subject matter, the housing is configured to divide the entire longitudinal length of the downspout into a first water collecting portion and a second unobstructed portion.

According to one aspect of the disclosed subject matter, the collector device includes a bracket that is configured for extending across the downspout opening to support the device in the downspout or for engaging about a seam of adjacent downspout sections.

According to one aspect of the disclosed subject matter, a system is provided. The system includes a rainwater collection device for being received within a downspout of a rain gutter assembly and a siphon pump including a pressure inlet for providing pressure forces from an external water supply and a siphon inlet for providing water that is collected from the rain gutter assembly.

According to one aspect of the disclosed subject matter, the pressure inlet and the siphon inlet extend in a parallel orientation until forming a combined outlet line.

According to one aspect of the disclosed subject matter, the system includes a collection tank sealably connected between the collection device and the siphon pump.

According to one aspect of the disclosed subject matter, the collection tank is formed from a flexible material. The collection tank includes an envelope or sleeve for receiving a rigid panel for maintaining the collection tank in an upright orientation.

According to one aspect of the disclosed subject matter, the collection tank includes a buoyant material on a top portion thereof for maintaining the top portion in a spaced-apart relationship to a ground surface when suspended by liquid.

According to one aspect of the disclosed subject matter, the collection tank defines a rigid end panel that includes an inlet for receiving fluids from the rainwater collection device and an outlet for communicating with the pump, wherein the inlet is defined at a higher position relative to the outlet.

According to one aspect of the disclosed subject matter, the inlet is positioned at an uppermost portion of the rigid end panel such that a chamber on the interior portion of the inlet fills and overflows into the collection tank, ensuring the collection tank fills entirely before overflowing back through the inlet.

According to one aspect of the disclosed subject matter, the system further includes a check valve sealably connected to the outlet for only allowing flow of fluid from the collection tank toward the pump.

According to one aspect of the disclosed subject matter, the system includes a valve being in sealed fluid communication with the pump and the external water supply, the valve being configured as a selectively engageable valve for switching between only external water supply or a combination of external water supply and water from the storage tank.

According to one aspect of the disclosed subject matter, the siphon pump includes a check valve for restricting flow from the siphon pump in the direction of the collection tank.

According to one aspect of the disclosed subject matter, the system includes a priming tank that translates from a lower position in close proximity to the tank to an upper position that is above the stored water volume of the tank.

According to one aspect of the disclosed subject matter, the system includes a check valve that prevents water from returning to the tank when it is in the upper position, thus forcing water in the direction of the outlet of the system, thereby creating a gravity siphon on the water in the tank According to one aspect of the disclosed subject matter, the system includes a plurality of drip tubes downstream of the collection vessel. Each tube location has a corresponding fixed member on which each tube can be sealably attached in order for the drip tubes to be selectively sealed to restrict flow of water therethrough.

According to one aspect of the disclosed subject matter, the system including a selectively engageable valve for switching between the said plurality of drip tubes or a main outlet for connecting with an additional attachment for spraying water.

According to one aspect of the disclosed subject matter, the collection device is free of collection apertures except for the at least one laterally extending collection aperture on the longitudinally extending wall.

According to one aspect of the disclosed subject matter, the collection device includes a longitudinally extending volume that replaces the straight section of a downspout in a gutter system, wherein the cross-sectional volume is divided into a first water collecting portion and a second unobstructed portion by a plane containing at least one collection aperture.

According to one aspect of the disclosed subject matter, the multiple collection tanks may be sealably connected such that a single siphon pump within the system may be employed to evacuate the entire system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 2A is a perspective view of a device for collecting rainwater according to one or more embodiments of the presently disclosed subject matter;

FIG. 2B is a perspective view of a device for collecting rainwater according to one or more embodiments of the presently disclosed subject matter;

FIG. 10A is an exploded, perspective view of a device for collecting rainwater in a gutter assembly according to one or more embodiments of the presently disclosed subject matter;

FIG. 10B is a side cross-sectional view of a device for collecting rainwater in a gutter assembly according to one or more embodiments of the presently disclosed subject matter;

FIG. 13A is an exploded, perspective view of a device for collecting rainwater in a gutter assembly according to one or more embodiments of the presently disclosed subject matter;

FIG. 13B is a side cross-sectional view of a device for collecting rainwater in a gutter assembly according to one or more embodiments of the presently disclosed subject matter;

FIG. 26A is a partial, sectional view of a collector device for use with for use with one or more collection systems disclosed herein according to one or more embodiments of the presently disclosed subject matter;

FIG. 26B is a perspective view of a collector device for use with for use with one or more collection systems disclosed herein according to one or more embodiments of the presently disclosed subject matter;

DETAILED DESCRIPTION

The presently disclosed subject matter now will be described more fully hereinafter with reference to the accompanying drawings, in which some, but not all embodiments are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
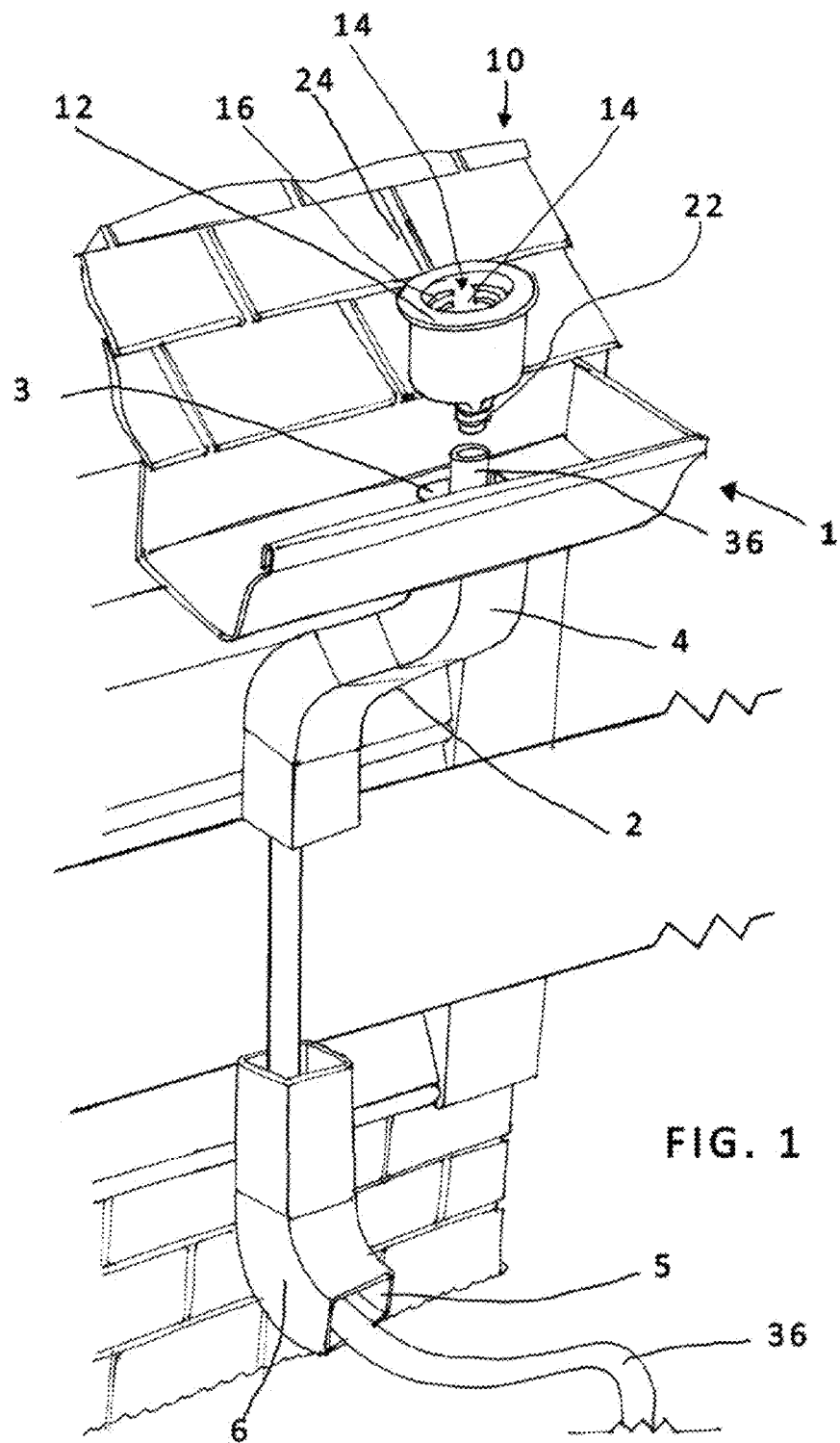
FIG. 1 is a perspective view of a device for collecting rainwater in a gutter assembly according to one or more embodiments of the presently disclosed subject matter.

FIG. 1 illustrates a rain-water collection device that is generally designated as 10 throughout the drawings. The device 10 is configured for being received within a rain gutter assembly 1, and more particularly configured for being received within a downspout 2 of the rain gutter assembly 1, in which the downspout 2 is of the type having an inlet 3 at a top portion 4 and an outlet 5 at a lowermost portion 6.

The device 10 includes a housing 12. The housing 12 may be formed of any appropriate material, and in one or more embodiments, may be formed of a plastic that is injection molded, while in accordance with embodiments of the subject matter, may be formed of a cast metal. The housing 12 defines a longitudinally extending passageway that is generally designated as 14. The passageway 14 allows flow of uncollected rainwater therethrough when the device 10 is received within the downspout 2 and rainwater is being collected in the gutter assembly 1.

The housing 12 defines at least one drain, which is depicted as a collection aperture 16 for allowing flow of collected rainwater therethrough. Collection of rainwater occurs when the surface tension created by contact between the housing 12 and rainwater flowing through the passageway 14 causes portions of the rainwater to flow through apertures 16. These collection apertures 16 may be laterally extending for collecting water while also filtering out debris, and, in one or more embodiments, may be slots as depicted. Each collection aperture 16 may take on any appropriately configured shape or design. The uppermost edge of each collection aperture 16 may define a contoured surface so as to divert rainwater into a collection chamber 20 illustrated more closely in FIGS. 3A and 3B using the surface tension of the water. The uppermost edge of each collection aperture 16 may be further configured for restricting the flow of debris therethrough. This may be due to, for example, the mass of debris being greater than the surface tension of rainwater flowing through device 10.

As illustrated in FIGS. 2A and 2B, the device 10 further includes a shoulder 24 that extends circumferentially from the housing 12. The shoulder 24 defines a bottom surface 26 that is provided for registration engagement with an upper surface of the rain gutter assembly 1 about the inlet 3 when the device 10 is received therein. The shoulder 24 may extend around all or a portion of the device 10. As used herein, extending circumferentially is used to describe the shoulder extending from all or a portion of the housing 12 and does not imply that the housing must have an oval or circular shape.

The housing 12 is defined by an outer assembly 30 and an interconnected inner assembly 32. In one or more embodiments, the shoulder 24 may extend from the inner assembly 32. A channel outlet 22 extends from the housing and is provided for allowing flowthrough of collected rainwater to a drain line. The channel outlet 22 includes a plurality of ribs 23 on an outer circumference thereof that are configured for interference engagement with, for example, a flexible outlet hose.

Figure 3A:
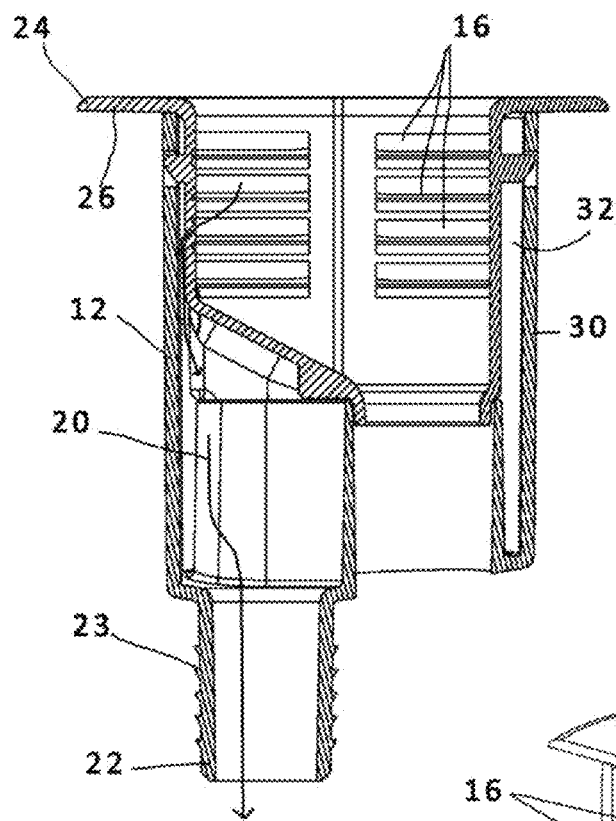
FIG. 3A is a side cross-sectional view of a device for collecting rainwater according to one or more embodiments of the presently disclosed subject matter.
Figure 3B:
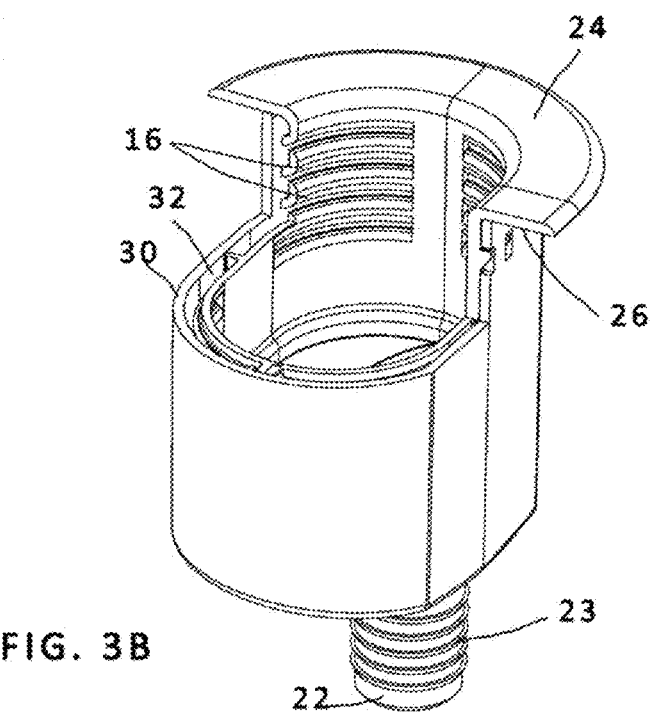
FIG. 3B is a perspective, sectional cut-out view of a device for collecting rainwater according to one or more embodiments of the presently disclosed subject matter.

As illustrated in FIGS. 3A and 3B, the housing 12 defines a collection chamber 20 that is in fluid communication with the collection apertures 16. In this manner, rainwater flows through the collection apertures 16 and into the collection chamber 20 and through the channel outlet 22. In accordance with embodiments of the subject matter, each collection aperture 16 may define a curved surface at an upper portion thereof for directed collected water into the collection chamber 20. Arrows illustrated in FIG. 3A depict the direction of water flow through device 10.

Figure 4:
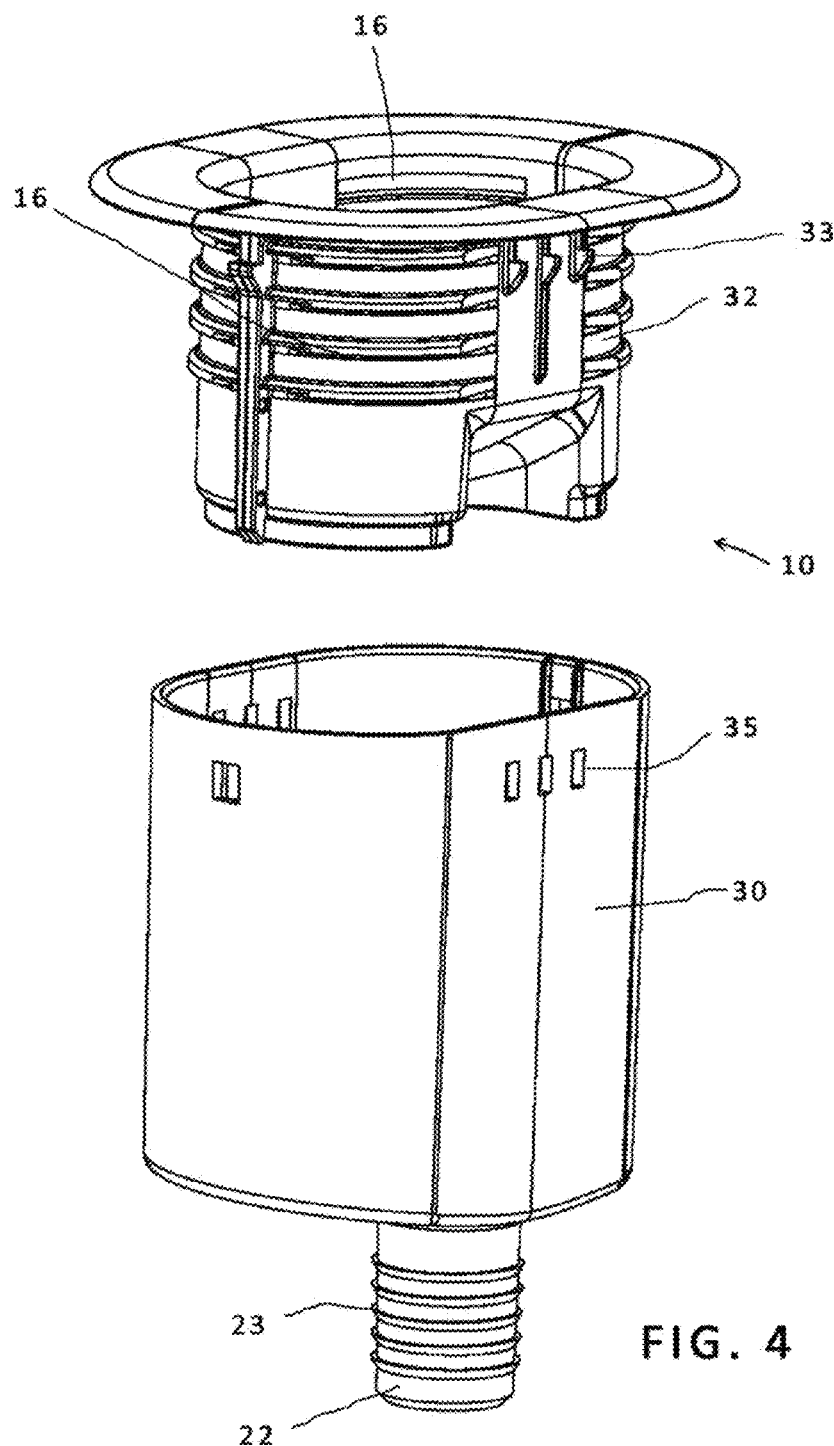
FIG. 4 is an exploded perspective view of a device for collecting rainwater according to one or more embodiments of the presently disclosed subject matter.

An exploded perspective view of the device 10 is illustrated in FIG. 4. As illustrated, the outer assembly 30 is configured for receiving the inner assembly 32. At least one engaging ear 33 may be carried by the inner assembly 32 and may be configured for cooperative engagement with a recess 35 defined in the outer assembly 30. In this manner, the inner assembly 32 may be positioned into the outer assembly 30 such that the at least one engaging ear 33 engages the recess 35 thereby affixing the outer assembly 30 with the inner assembly 32. In one or more embodiments, each of the outer assembly 30 and inner assembly 32 may be formed from more than one piece. In one or more embodiments, the device 10 may be formed of an integral piece of material.

The device 10 may be in communication with a drain line 34. According to one or more embodiments, the drain line 34 may be engaged with the channel outlet 22 by any appropriate manner. For example, the drain line 34 may be engaged with the channel outlet 22 by sliding the drain line 34 over the drain outlet 22. The plurality of ribs 23 are configured for providing stress points on the drain line 34 when engaged with the channel outlet 22 for maintaining the drain line 34 on the channel outlet 22. In one or more embodiments, the drain line 34 may be integrally formed with the channel outlet 22, while in one or more embodiments, the drain line 34 may be secured to the channel outlet 22 by a clamp or fastener, such as, for example, a hose clamp.

Figure 5:
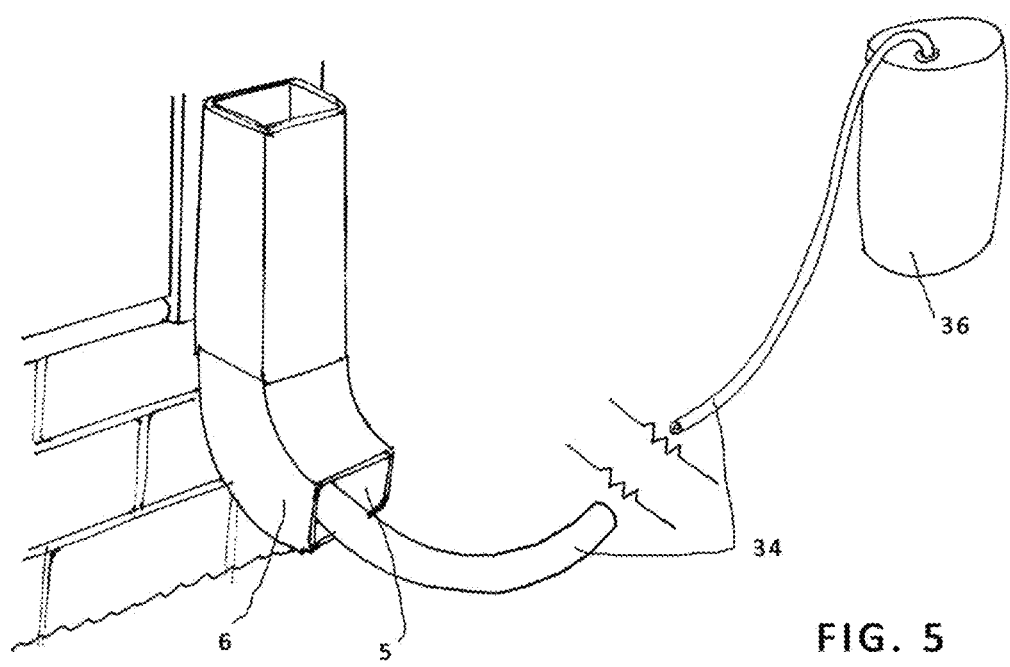
FIG. 5 is a perspective view of an outlet hose and storage tank for use with a device for collecting rainwater according to one or more embodiments of the presently disclosed subject matter.

As illustrated in FIG. 5, the drain line 34 is configured for passing through the gutter assembly 1 and through the gutter outlet 5. In this manner, the device 10 may be installed in the gutter inlet 3 by feeding the drain line through the gutter inlet 3 until the drain line 34 passes through the gutter outlet 5. The drain line 34 may be fluidly connected with a storage vessel of any appropriate type, such as, for example, a storage tank 36 as illustrated in FIG. 5. In one or more embodiments, the storage tank 36 may be stored underground. In one or more embodiments, the storage tank 36 may include a spigot for removing collected rainwater, while in other embodiments, may include a pump for pumping collected rainwater.

Figure 6:
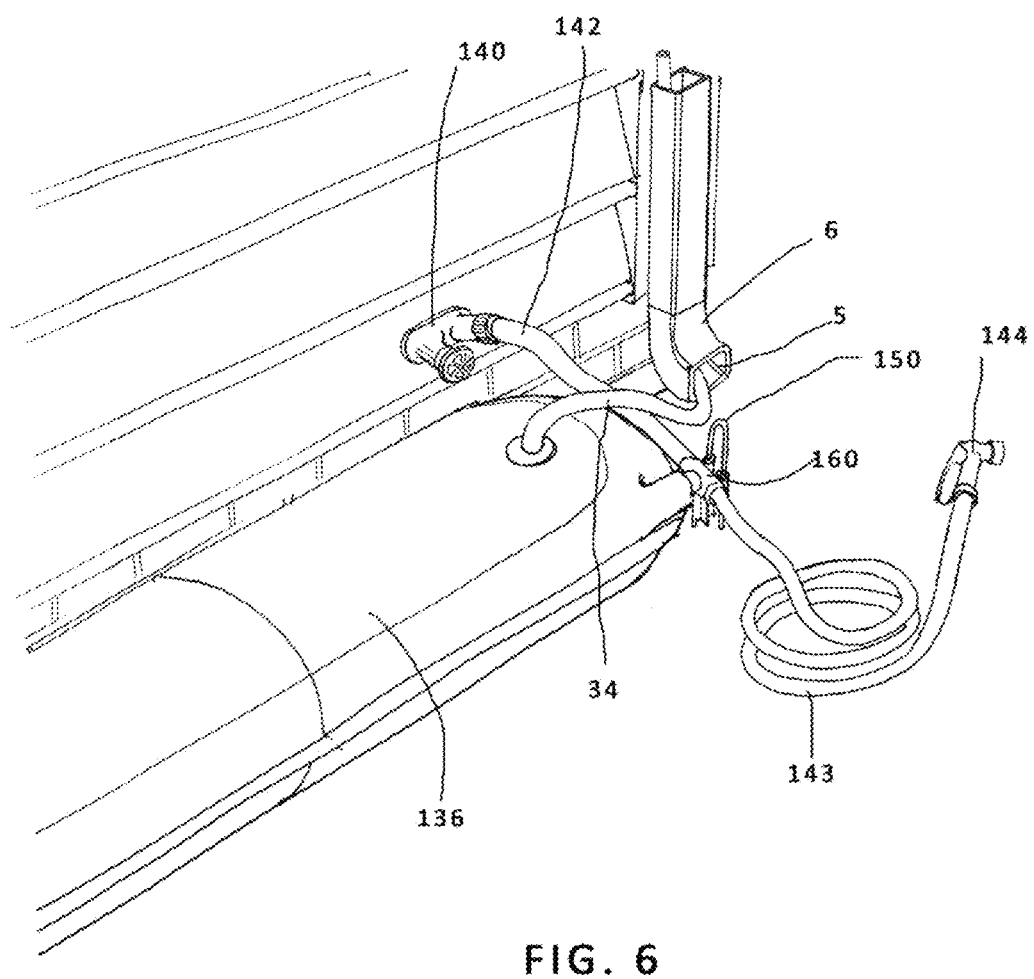
FIG. 6 is a perspective view of an outlet hose and storage tank for use with a device for collecting rainwater according to one or more embodiments of the presently disclosed subject matter.

As illustrated in FIG. 6, the drain line 34 may also be fluidly connected to a storage vessel such as a bladder 136. The bladder 136 may be formed from a flexible material so as to allow the bladder 136 to expand and contract as necessary depending on the volumetric requirements of the bladder 136. The bladder 136 is configured for communication with a siphon pump assembly 160 that is engaged with the bladder 136 and fluidly connected to a spigot 140 by a line 142. The siphon pump assembly 160 may be in further communication with a spray nozzle 144 or similar device through line 143. The siphon pump assembly 160 may be carried by a support 150 that is configured for allowing slideable movement of the siphon pump assembly 160 as the bladder 136 expands and contracts with varying volume amounts. In this manner, portions of the siphon pump assembly 160 are maintained in a position above the stored water in the bladder 136 with an internal tube extending to the bottom of the bladder 136 to evacuate the stored water. Collected water is siphoned out of the bladder 136 when the spigot 140 is turned on and water is allowed to flow through the siphon pump assembly 160. The bladder 136 may be formed from a moisture or rot and degradation resistant material. In accordance with one or more embodiments, the bladder 136 may also comprise protection against ultraviolet (UV) degradation. In accordance with one or more embodiments, the bladder 136 may comprise a printed pattern that would act as camouflage to its environment, such as, for example, a mulch pattern or camouflaging pattern. In accordance with one or more embodiments, the camouflaging print may be provided directly on the bladder 136, while, in accordance with embodiments, may be provided on a cover configured for enclosing and covering the bladder 136. In accordance with one or more embodiments, a separate cover for the bladder 136 may provide a protective barrier between the bladder 136 and the ground to prevent material degradation.

The bladder 136 or storage tank 36 may be positioned in relative proximity to the gutter assembly 1, or may be spaced-apart therefrom. The bladder 136 or storage tank 36 may rest on the ground surface, may be positioned on a structure or platform, or may be buried under the ground in one or more embodiments.

Figure 7A:
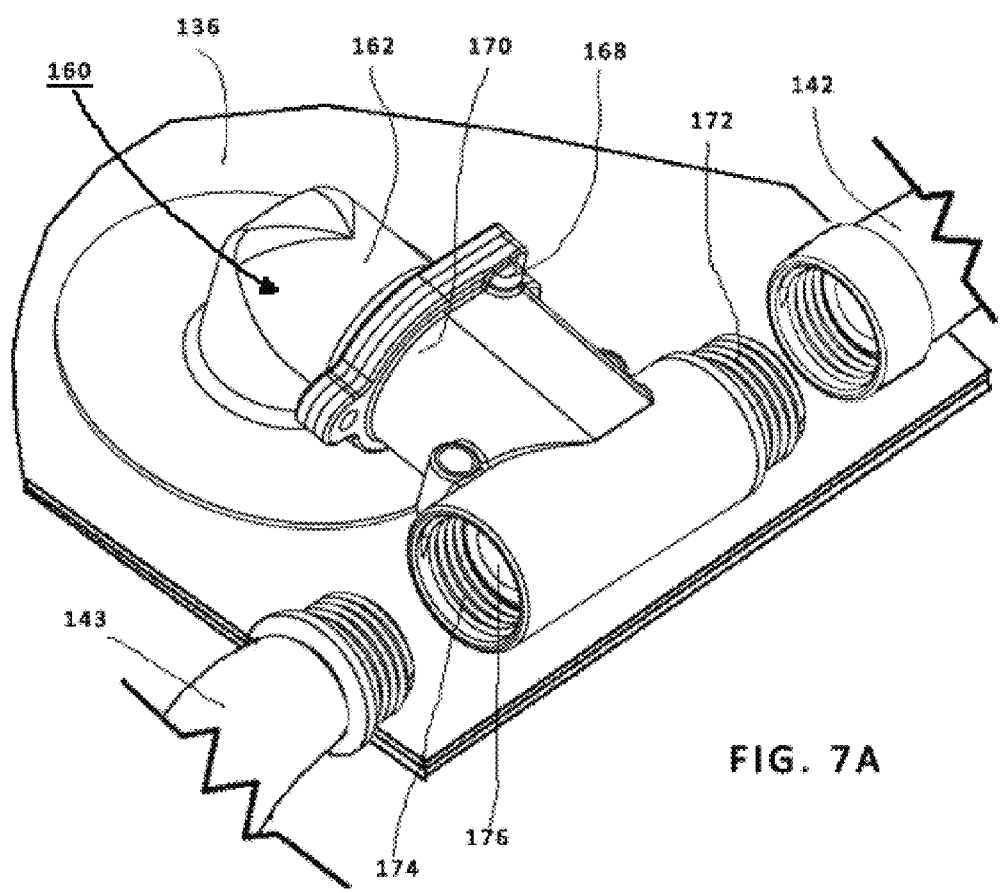
FIG. 7A is a perspective view of a siphon assembly for use with a storage tank tank according to one or more embodiments of the presently disclosed subject matter.
Figure 7B:
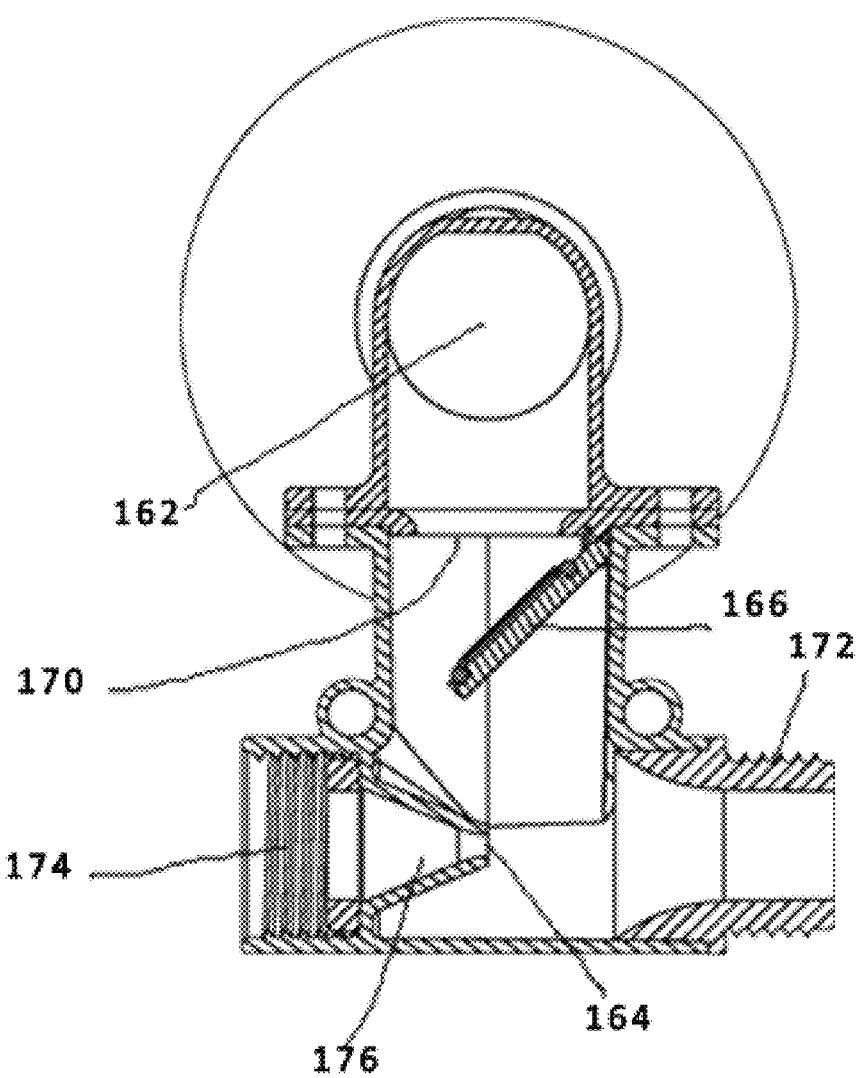
FIG. 7B is a top view of a siphon assembly for use with a storage device according to one or more embodiments of the presently disclosed subject matter.
Figure 8:
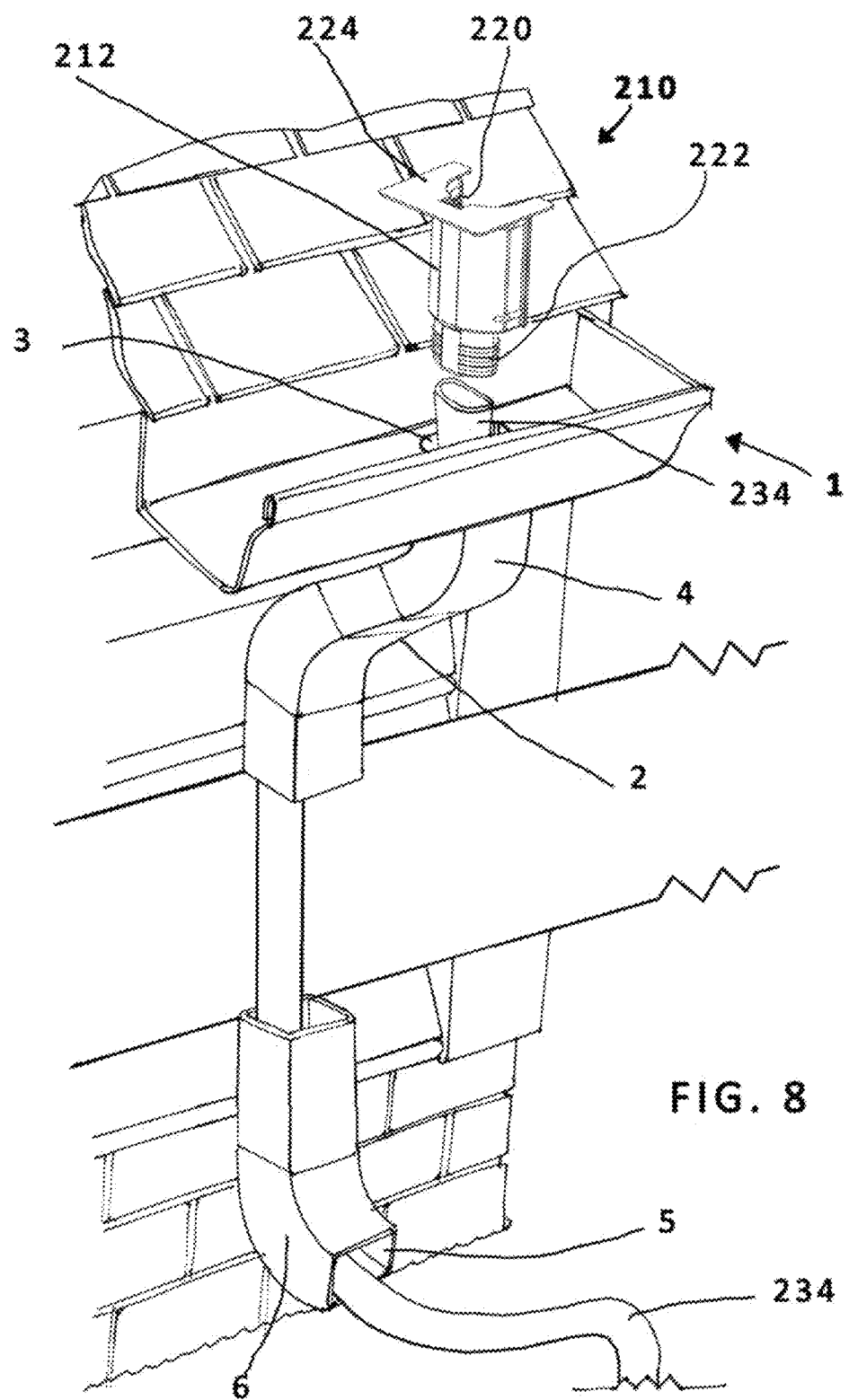
FIG. 8 is a perspective view of a device for collecting rainwater in a gutter assembly according to one or more embodiments of the presently disclosed subject matter.

An enlarged perspective view of the siphon pump assembly 160 is illustrated in FIGS. 7A and 7B. The siphon pump assembly 160 includes a mount 162 that is configured for being in engagement with the bladder 136. The mount 162 is fluidly connected with a siphon housing 164. The siphon housing 164 encloses a flap valve 166 that is hingedly connected about a base 168. In accordance with one or more embodiments of the subject matter, a ball, float, or any suitable valve may be utilized in a manner similar to flap valve 166. An outlet passage 170 is defined about the intersection of the base 168 and mount 162 and allows for flowthrough of collected water when the flap valve 166 is in an opened position. The flap valve 166 may be biased by a spring or similar mechanism into an open position in which the valve 166 is in sealable engagement with the base 168. The siphon pump assembly 160 may include an externally threaded portion 172 for threadably attaching with a conventional water hose fitting such as that which is illustrated on line 143 in FIG. 7A. Additionally, the siphon pump assembly 160 may include an internally threaded portion 174 for threadably attaching with a conventional water hose fitting such as that which is illustrated on line 142 in FIG. 7A. A nozzle 176 may be formed within the housing 164 about the internally threaded portion 174 for reducing the flow volume into line 143 and increasing the velocity, thereby increasing vacuum pressures to facilitate siphoning fluids from bladder 136 or storage tank 36. The flap valve 166 is configured for being in a neutral position, responding to the pressure within the siphon pump assembly 160. Upon flowthrough of water through the housing 164, the flap valve 166 will open when sufficient vacuum pressure is developed to force the flap valve 166 into the open position, thereby allowing flowthrough of collected water from the bladder 136 or storage tank 36 into the siphon pump assembly 160 and into line 143 for application as desired by the operator. If the line 143 is closed, the flap valve 166 will close in response to back pressure within the siphon pump assembly 160 such that filling or pressurization of the bladder 136 or storage tank 36 cannot occur.

In this manner, line 142 and 143, which according to aspects disclosed herein, may be a conventional water hose, may provide pumping forces to the siphon pump assembly 160. When pumping forces are provided to the siphon pump assembly 160, the flap valve 166 will open to the open position and allow flowthrough of stored water from the storage tank 36 or bladder 136. In the example in which a conventional water hose connected to a spigot is connected to the siphon pump assembly 160, the operator would turn on the spigot to provide flow of water through the water hose and thereby provide pumping forces to the siphon pump assembly 160. Stored water would then be siphoned through the siphon pump assembly 160 through line 143 where it would mix with water flowing from the spigot.

A device according to one or more embodiments is illustrated in FIGS. 9A, 9B, 10A, and 10B and is generally designated 210. The device 210 includes a housing 212 that is configured for being received in a first portion of the downspout inlet opening 3 such that a second portion of the downspout inlet opening allows flow of uncollected water to flow through the gutter assembly 1 in a manner similar to conventional gutter systems. The housing 212 defines at least one collection aperture 214 on a surface 216 of the housing 212 that allows for flow of collected water therethrough. The surface 216 may, in one or more embodiments, be substantially vertical. The collection aperture 214 may define a curved surface on the upper edge that is configured for directing rainwater through the aperture 214 based on interaction of the surface tension of the water therewith. In this manner, debris that may be intermixed with rainwater will be allowed to continue flowing through the gutter assembly 1 since the collection aperture 214 is configured to create surface tension that is capable of filtering the water into the collection chamber but not capable of overcoming the mass associated with debris which then flows through the gutter assembly 1. A collection chamber 200 is defined by the housing 212 and is in communication with the collection aperture 214 for containing collected water. A drain outlet 222 is in communication with the chamber 220 for allowing flow of collected water therethrough. The drain outlet 222 may be in further communication with a drain line 234 that may extend to a storage tank or similar systems as used with device 10.

Figure 9A:
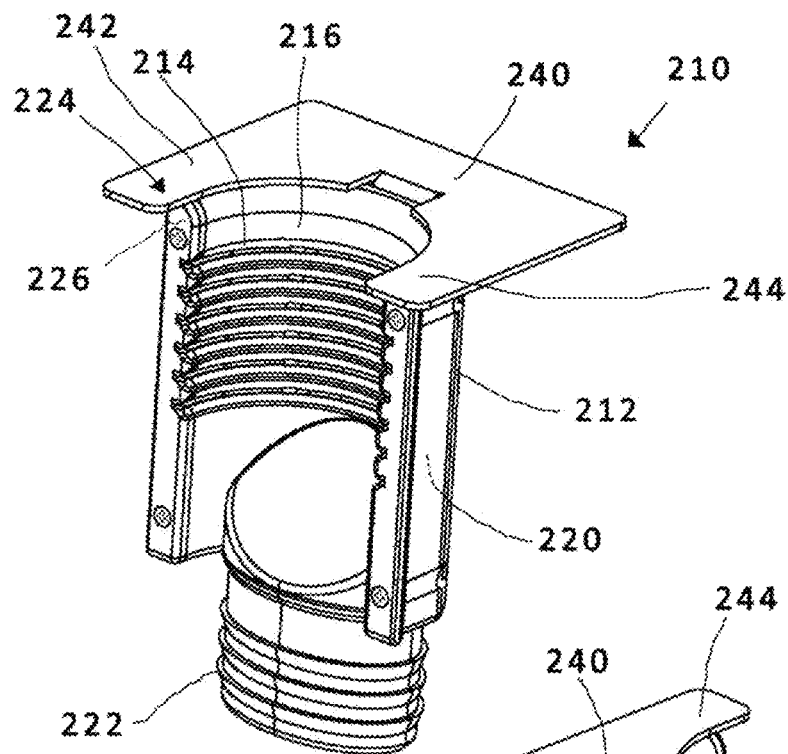
FIG. 9A is a perspective, sectional view of a device for collecting rainwater in a gutter assembly according to one or more embodiments of the presently disclosed subject matter.
Figure 9B:
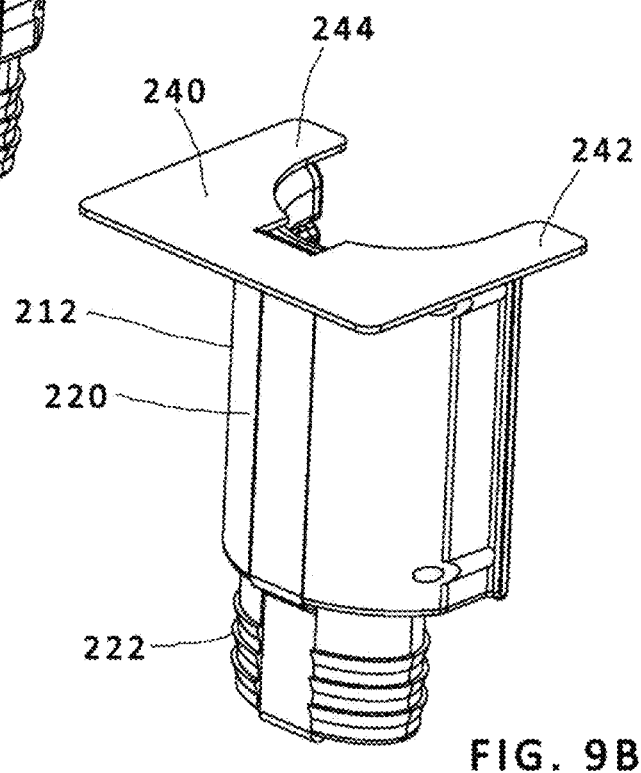
FIG. 9B is a perspective, sectional view of a device for collecting rainwater in a gutter assembly, and cooperating with the view of FIG. 9A to form the device according to one or more embodiments of the presently disclosed subject matter.

A shoulder 224 is carried at an upper portion 226 of the housing 210. The shoulder 224 is configured to span at least a portion of an upper surface of the rain gutter assembly 1 to provide registration engagement therewith and secure the device 10 about the rain gutter assembly 1. The shoulder 224 may generally define a first planar portion 240 that carries laterally extending elongate elements 242 and 244 as illustrated in FIG. 9B.

The device 210 may be used in a manner similar to device 10 as illustrated in FIGS. 1 through 4. For example, device 210 may be used with a storage tank that has a siphon pump assembly similar to that which is illustrated in FIG. 6.

Figure 11:
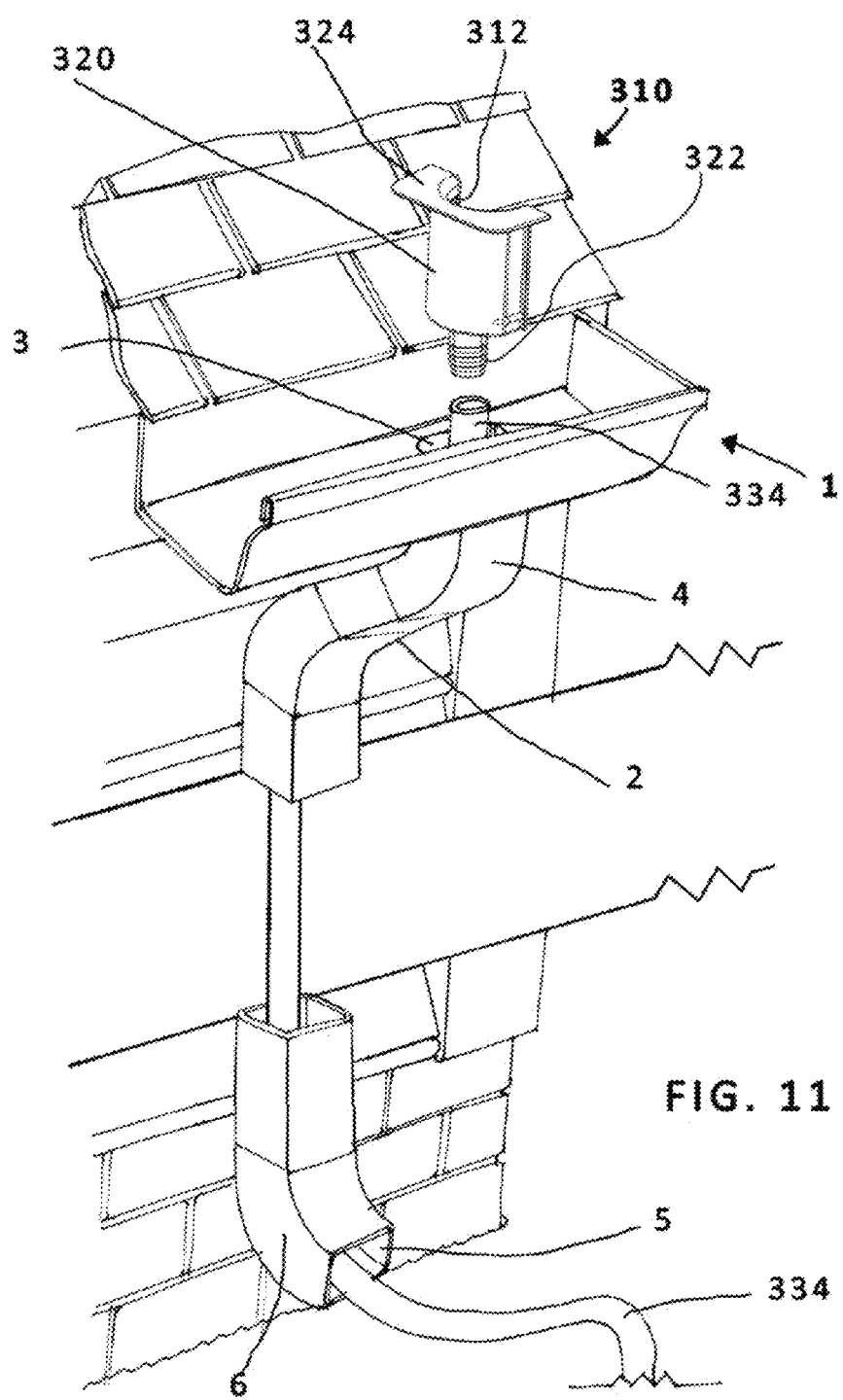
FIG. 11 is a perspective view of a device for collecting rainwater in a gutter assembly according to one or more embodiments of the presently disclosed subject matter.
Figure 12A:
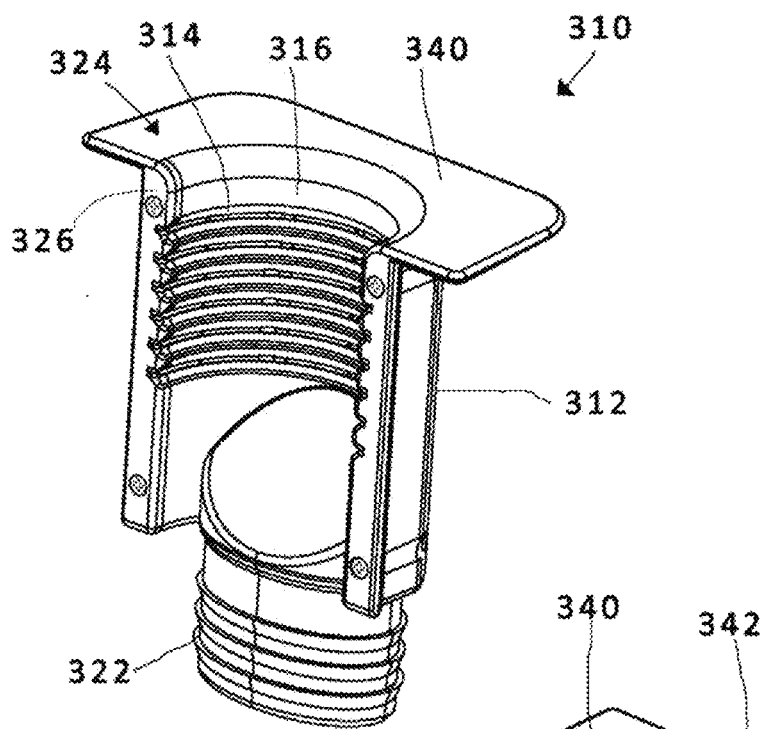
FIG. 12A is a perspective view of a device for collecting rainwater in a gutter assembly according to one or more embodiments of the presently disclosed subject matter.
Figure 12B:
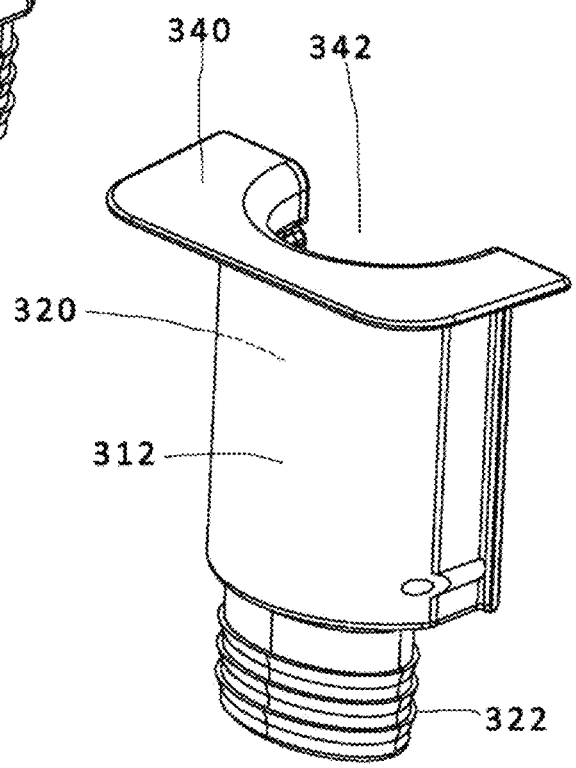
FIG. 12B is a perspective view of a device for collecting rainwater in a gutter assembly, and cooperating with the view of FIG. 12A to form the device according to one or more embodiments of the presently disclosed subject matter.

Alternatively, a device 310 is illustrated in FIG. 11 that shares many features with the device illustrated in FIGS. 12A, 12B, 13A, and 13B. For example, device 310 includes a housing 312 that defines a collection aperture 314 on a surface thereof for allowing flow of collected water therethrough. The housing 312 may be sized such that it is configured for being received in a first portion of a downspout inlet such that a second portion of the downspout inlet allows flow of collected water therethrough. A collection chamber 320 is in communication with the collection aperture 312 for containing collected water. A drain outlet 322 is in communication with the chamber 320 for allowing flow of collected water therethrough. A shoulder 324 is carried at an upper portion 326 of the housing 312 and spans at least a portion of an upper surface of a rain gutter assembly. The shoulder 324 may include a generally planar portion 340 that defines an opening 342 that generally corresponds to the second portion of the downspout inlet that allows flow of uncollected water therethrough. The device 310 may be used in a manner similar to device 10 as illustrated in FIGS. 1 through 8. For example, device 310 may be used with a storage tank that has a siphon pump assembly similar to that which is illustrated in FIG. 6.

A system such as that which is illustrated throughout the drawings presents various advantages over conventional systems. For example, a system according to one or more embodiments of the disclosed subject matter may be easily installed in an existing gutter assembly without modifying the gutter assembly. A system according to one or more embodiments allows the user to place the bladder 136 or storage tank 36 away from the downspout of a gutter assembly in, perhaps, a location more easily concealed. Another advantage is that a system according to one or more embodiments does not rely on gravity or an electric pump for the distribution of collected rain water but uses standard household water pressure to power the siphon pump assembly 160. Yet another advantage of a system according to one or more embodiments is that such a system is compact for more efficient transport, store merchandizing, user installation, and winterization storage. Still another benefit over conventional systems is that the collector may be entirely hidden from view. Due to the low profile the system can be hidden behind shrubs. Another significant advantage is that since the system uses water surface tension to filter out debris, the system does not require an additional debris screen that must be periodically cleaned.

Figure 14:
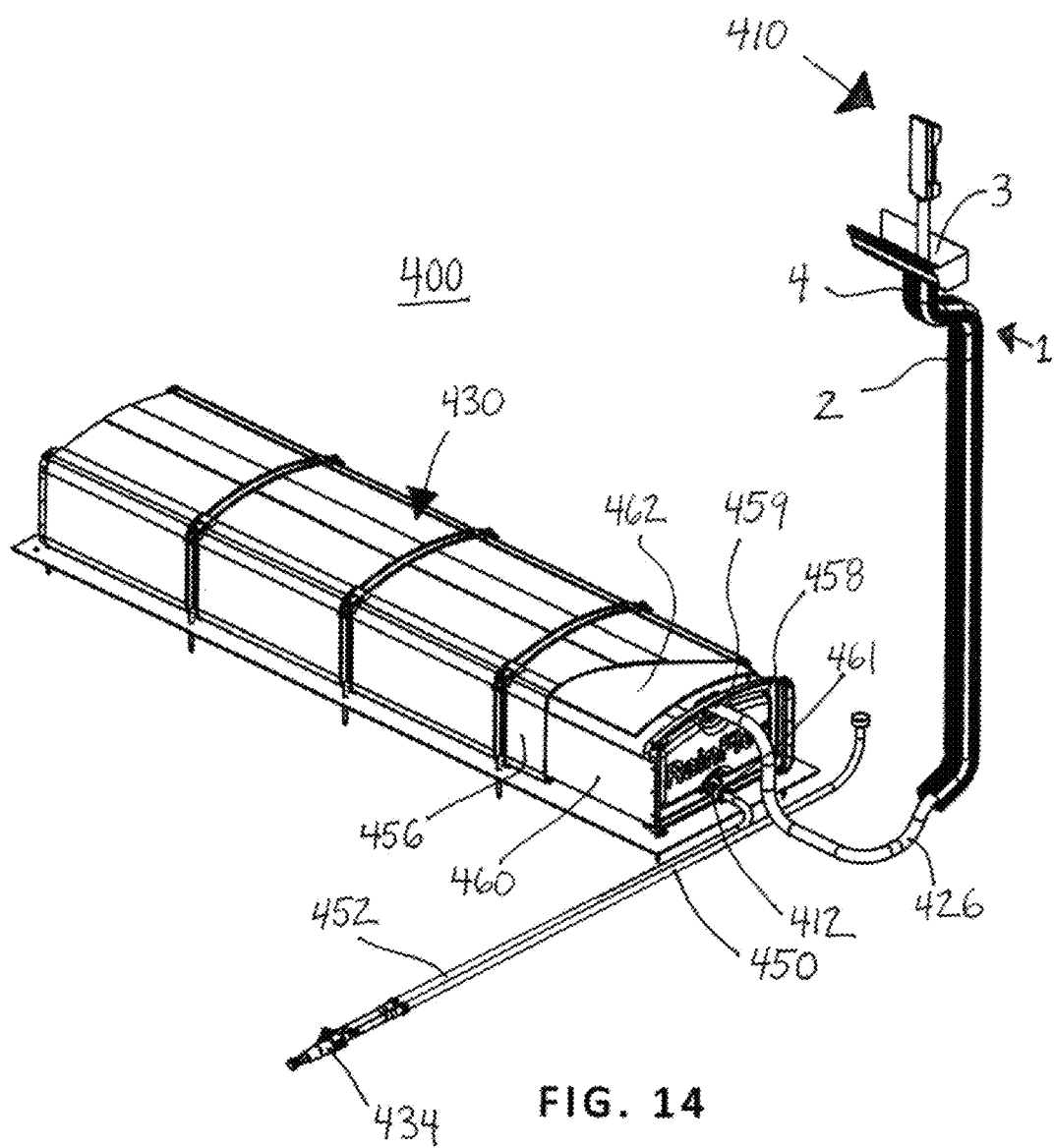
FIG. 14 is a perspective view of a collection system according to one or more embodiments of the presently disclosed subject matter.

FIG. 14 illustrates a system that may be used with any of the collectors described herein, the system being generally designated as 400. The system 400 may include a collector device 410 that is provided for being received within the inlet 3 of the gutter assembly 1. The collector device 410 may be provided in communication with a drain line 426 that is engaged with a collection storage tank 430.

The storage tank 430 may include an envelope 456 on a side thereof for receiving one or more sufficiently rigid panels 460 that maintain the storage tank 430 in a generally upright position. The panels 460 may be selectively removable. This configuration may be useful for product packaging purposes. The storage tank 430 may further include a buoyant material 462 on an upper portion thereof for lifting the upper portion of the tank 430 during filling thereof. The storage tank 430 may be further provided with sufficiently rigid end panels 458 that act to maintain the storage tank 430 in a desired configuration and also to which an inlet portion 459 and an outlet portion 461 are formed. The inlet portion 459 may be at a higher position on the end panel 458 than the outlet portion 461.

The storage tank 430 includes an inlet 459 on each opposing side and an outlet 461 on each opposing side. The inlet 459 is positioned on the upper portion of each end panel 458 and the outlet 461 is positioned on the lower portion of each end panel 458 thus allowing multiple tanks to be cooperatively connected to each other to form a circuit that fills at an equal level. This arrangement of multiple inlets 459 and outlets 461 on each tank 430 also allows the entire system having multiple tanks 430 to be evacuated with a single siphoning device.

One or more check valves may be provided, including check valve 418 formed in communication with the outlet 461 for keeping downstream liquids from flowing back into the storage tank 430. An eductor or siphon device 434 may be provided in communication with the storage tank 430 via siphon inlet line 452. The eductor or siphon device 434 may be further in communication with a pressure line 450 that may be, for example, a spigot line from a residential or commercial building. The pressure line 450 provides sufficient pressure to siphon fluids collected from the storage tank 430.

Figure 15:
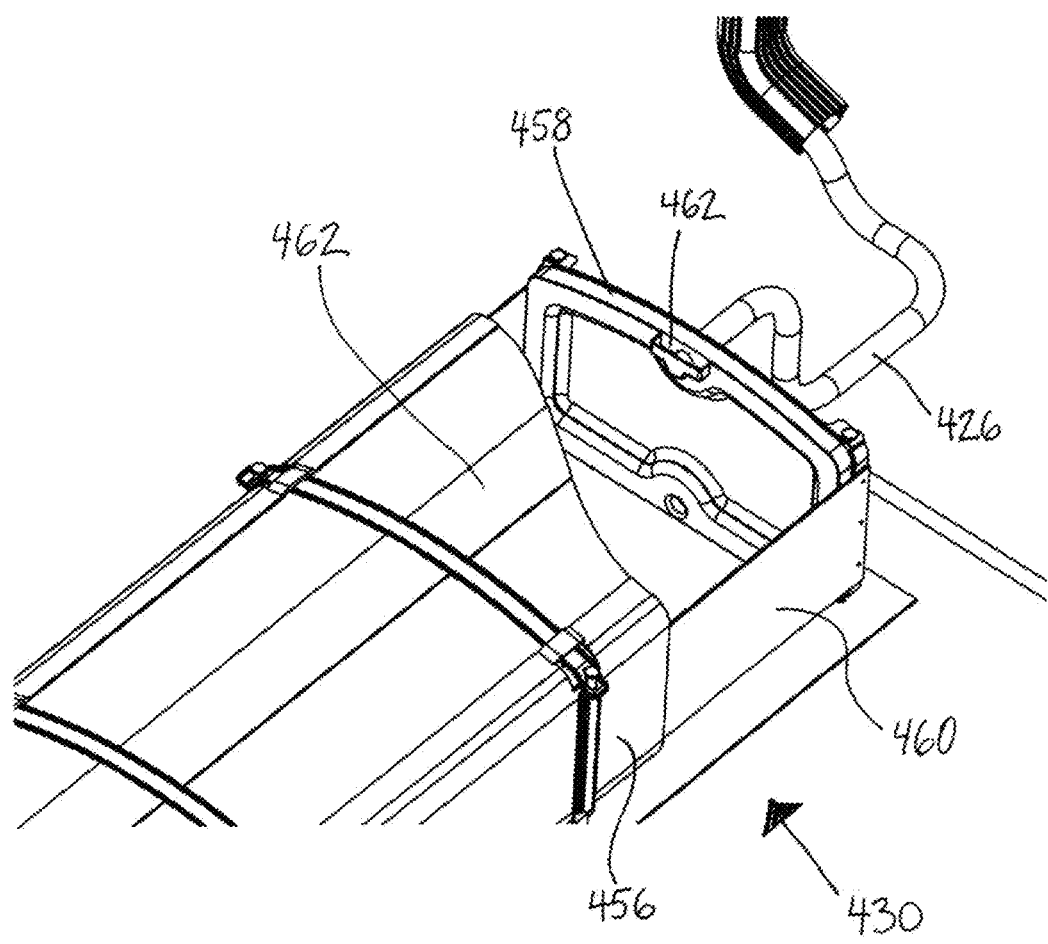
FIG. 15 is a sectional, perspective view of a collection tank according to one or more embodiments of the presently disclosed subject matter.

With further reference to FIG. 15, a sectional view of the storage tank 430 is illustrated. A fill chamber 462 may be provided on an inner facing wall of the end panel 458. The fill chamber 462 may be configured such that the storage tank 430 can be fully or nearly fully filled without overflowing into line 426. In this manner, the fill chamber 462 must fill up and then overflow into the storage tank 430. Collected water can then not enter the fill chamber 462 unless the water level is higher than the wall height of fill chamber 462, at which point the storage tank 430 would be fully or nearly fully filled.

Figure 16:
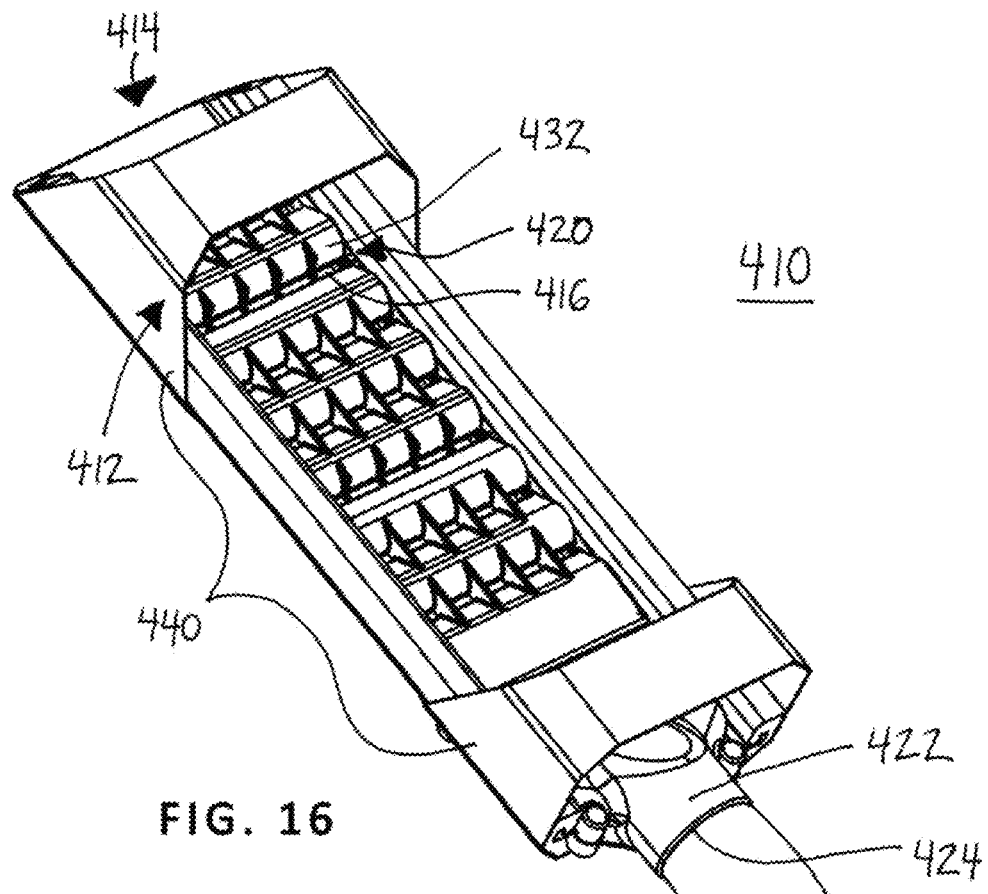
FIG. 16 is a perspective view of a collector device according to one or more embodiments of the presently disclosed subject matter.
Figure 17:
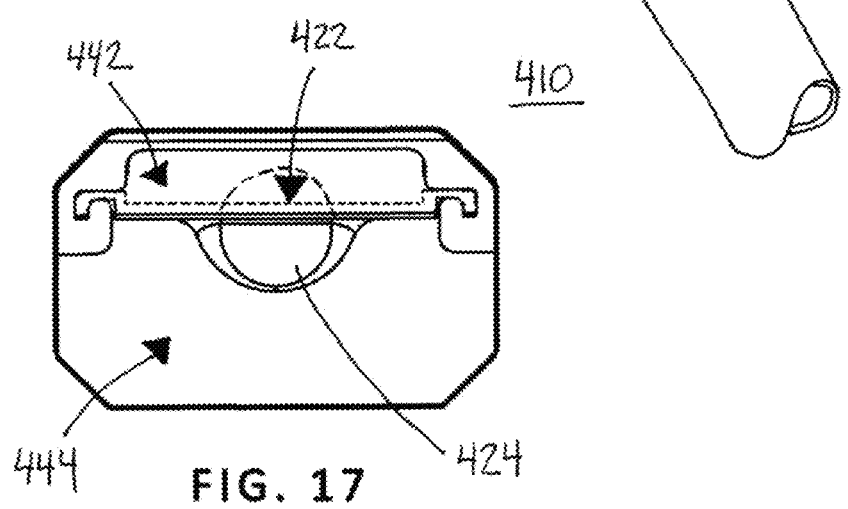
FIG. 17 is a top view of a collector device according to one or more embodiments of the presently disclosed subject matter.

The collector device 410 is shown in greater detail with reference to FIG. 16 and FIG. 17. The collector 410 includes a housing 412 that defines a longitudinally extending passageway 414 for allowing flow of uncollected water therethrough. At least one laterally extending collection aperture 416 is defined in a longitudinally extending interior wall 412 in the housing for allowing flow of collected water therethrough. A collection chamber 422 is in fluid communication with the at least one collection aperture 416 for collecting water. A drain outlet 424 is in communication with the collection chamber 422 for allowing flow of collected water therethrough. The collection apertures 416 defines a curved surface at an upper portion thereof for directing collected water into the collection chamber 422, whereby the surface tension of the water flowing over the curved surface causes the water to flow into the collection chamber 422 while gravity causes the debris to flow through the passageway 414. In one or more embodiments, all such collection apertures are located on a vertically oriented wall, employing surface tension as a means of debris filtering, thus allowing debris filtering without the need for a filter screen that requires periodic cleaning.

The collector device 410 may define a first portion 442 that is the water collecting portion and a second, unobstructed portion 444 in which uncollected rainwater and debris may continue to flow through the gutter assembly 1. The portions 442, 444 and the housing 412 may collectively define a cross-section that approximates the cross-section of the gutter assembly 1.

As illustrated, the collector device 410 may include one or more portions 440 that may be hingedly, flexibly, or otherwise connected in some manner such that each portion 440 can be manipulated relative to each subsequent portion. In this manner, the collector device 410 is flexible in nature and could be translated through curved portions of the gutter assembly 1. In this manner, the collector device 410 may be inserted through a bottom portion of the gutter assembly 1 and translated up through downspout 2 through the curved portion of the upper portion 4.

In one or more embodiments, outlet hose 426 may be sufficiently rigid such that the collector device 410 can be inserted into the bottom of the downspout 2 and translated into the installed position. In one or more additional embodiments, outlet hose 426 may be sufficiently rigid to support the collector device 410 at an elevated position within the downspout 2.

Figure 18:
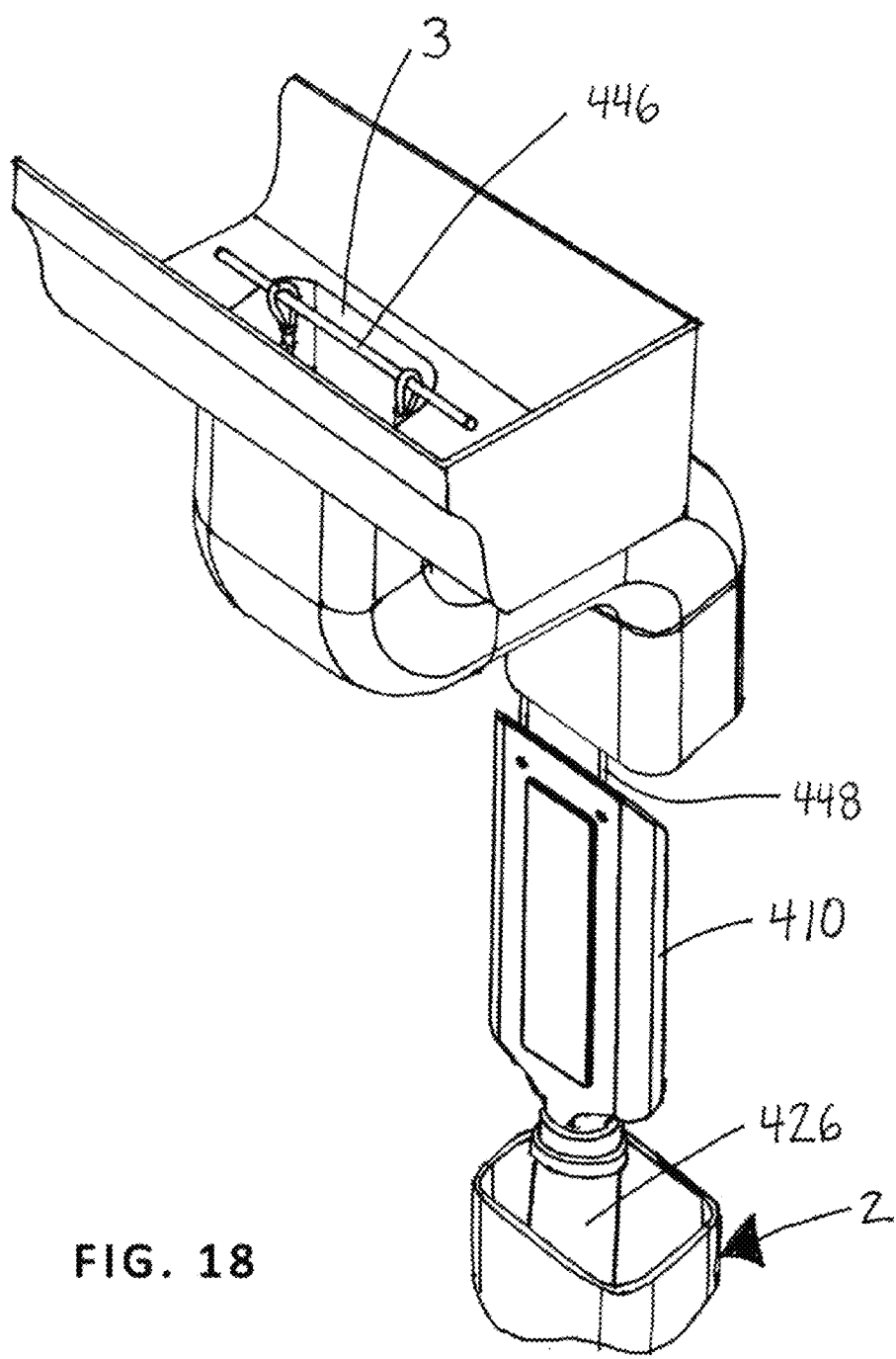
FIG. 18 is a top facing perspective view of a collector device installed within a downspout according to one or more embodiments of the presently disclosed subject matter.

An alternate embodiment of collector device 410 is illustrated in FIG. 18 in which the collector device 410 includes a bracket 446 that extends from the device 410 to the top facing surface about the opening 3 of the downspout 2. In this manner, the device 410 may be installed by inserting the outlet hose 426 into opening 3 of the downspout 2, feeding in the outlet hose, the collector device 410 followed by the bracket supports 448 until the bracket 446 comes to rest on the top facing surface about opening 3, thereby supporting the weight of the system. the outlet hose 426 is then reassembled to the storage tank inlet 459.

Figure 19:
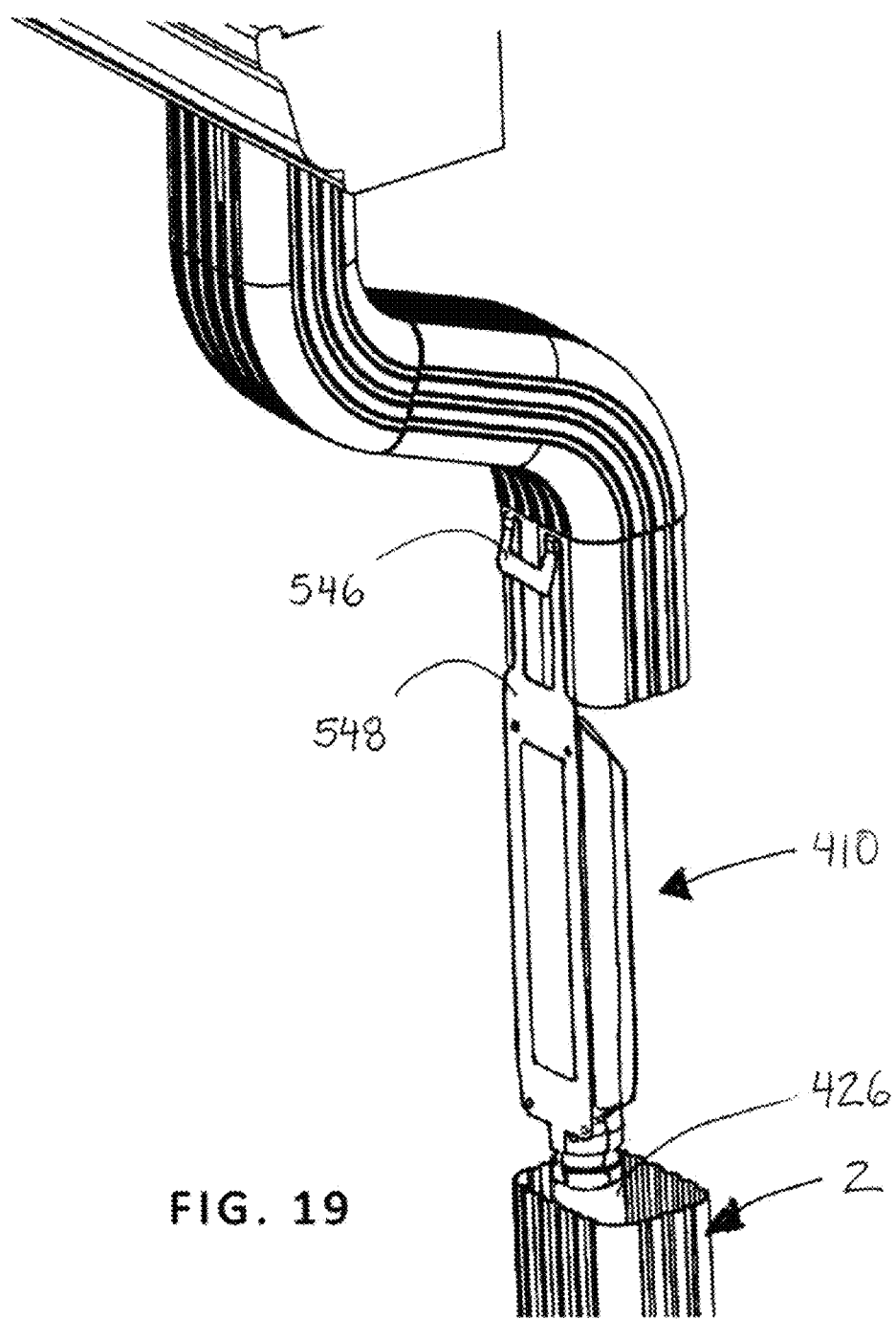
FIG. 19 is a perspective view of a collector device installed within a downspout according to one or more embodiments of the presently disclosed subject matter.

An alternate embodiment of a collector device 410 is illustrated in FIG. 19 in which the collector device 410 includes a bracket 546 that extends from the device 410 to the top facing surface about the opening 3 of the downspout 2. In this manner, the device 410 may be installed by sectioning the downspout 2, installing the bracket 546 about the opening 3, feeding bracket supports 548 through the downspout 2, and then connecting to device 410. The downspout 2 is then reassembled, enclosing the collector device 410 therein.

Figure 20:
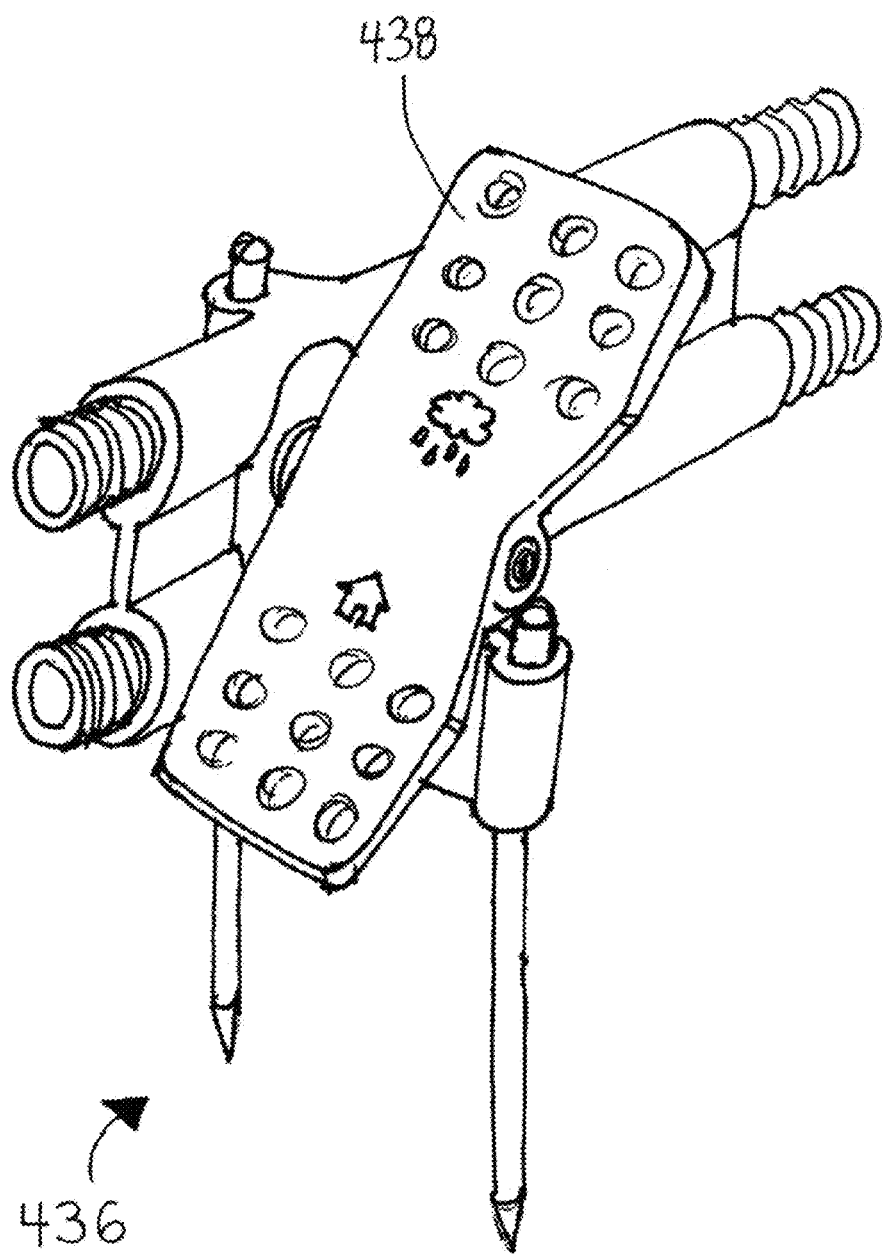
FIG. 20 is a perspective view of a valve for use with the one or more collection systems disclosed herein according to one or more embodiments of the presently disclosed subject matter.
Figure 21:
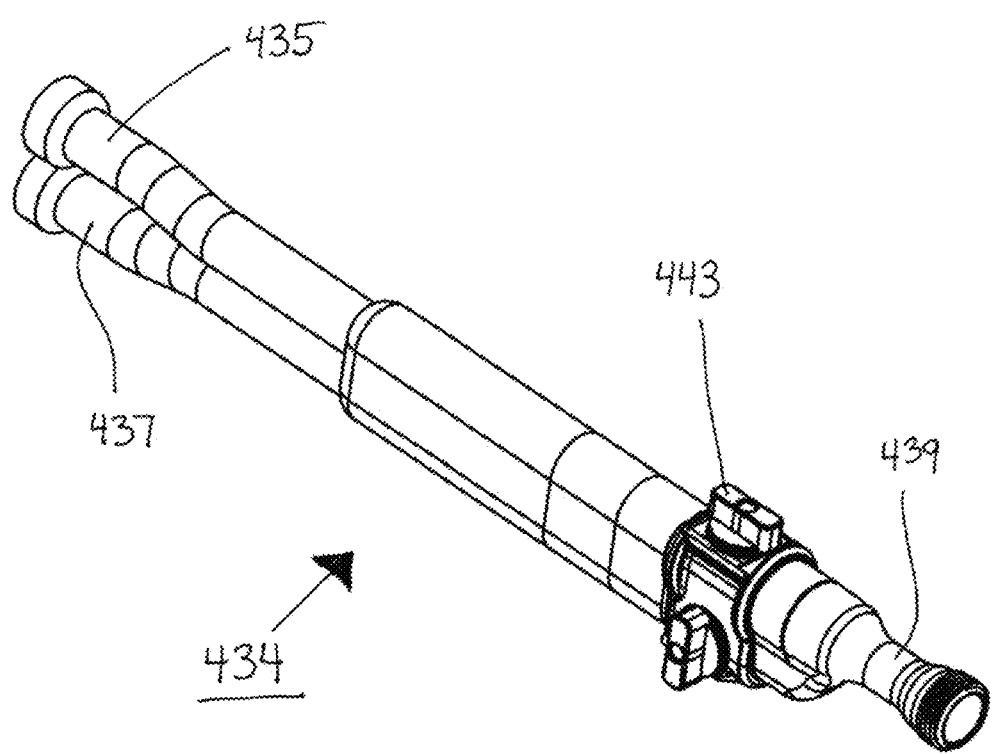
FIG. 21 is a perspective view of a valve for use with the one or more collection systems disclosed herein according to one or more embodiments of the presently disclosed subject matter.

As illustrated in FIG. 20, a valve 436 is provided. The valve may include one inlet from the external water supply, one inlet from the storage tank 430, one outlet directed towards the siphon pump 434 which will direct water from the external water supply to the siphon pump 434 and one outlet having a selectively engageable valve 436. The valve 436 may include a hand activated or step-activated switch 438 that is configured for bypassing siphoning of collected water from the storage tank 430 and instead supplying additional water from the external water source through siphon inlet line 452. One or more posts may be provided for securing the valve 436 to a proximal ground surface.

Figure 22B:
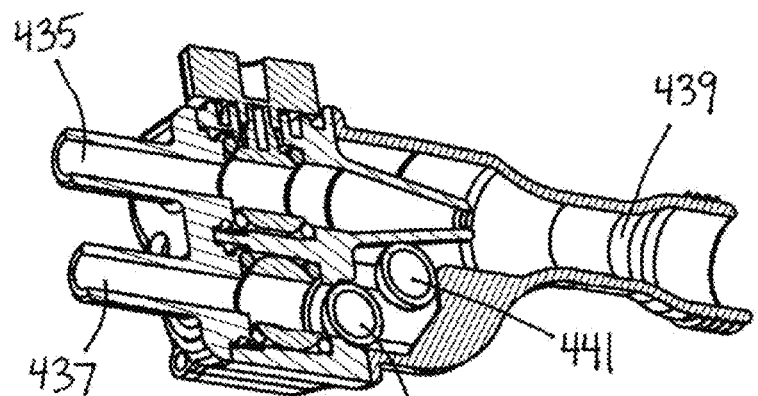
FIGS. 22A, 22B, and 22C are one or more cross-sectional views of the valve of FIG. 21 for use with one or more collection systems disclosed herein according to one or more embodiments of the presently disclosed subject matter.
Figure 22C:
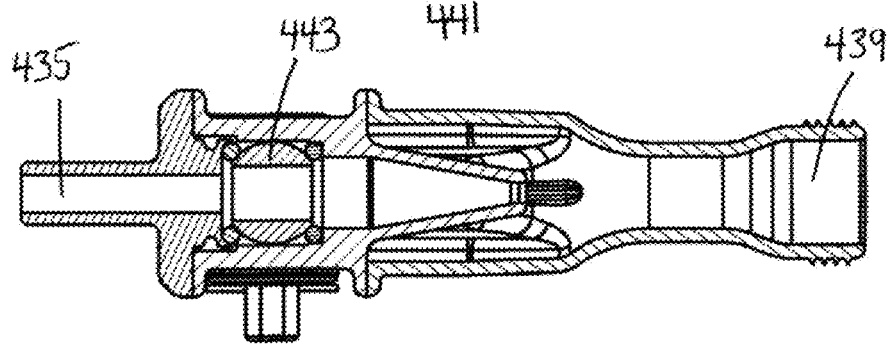
Figure 22A:
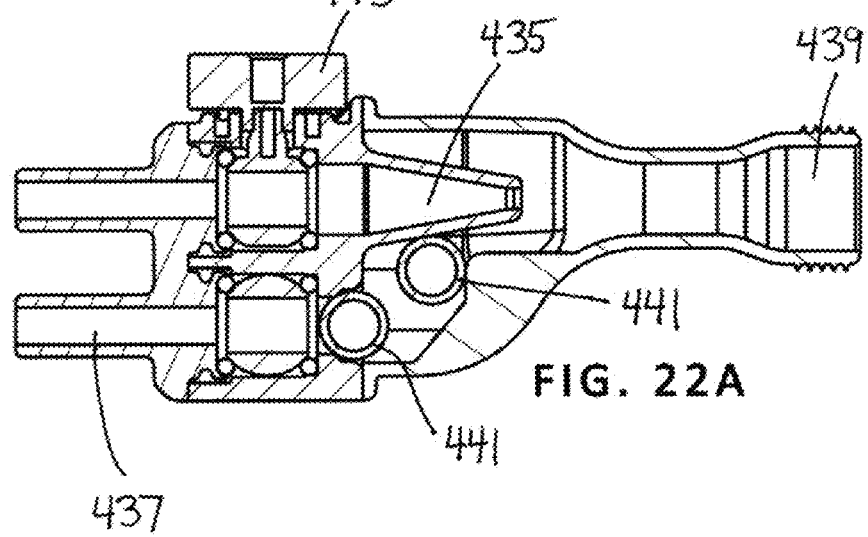

As illustrated in FIG. 21, FIG. 22A, FIG. 22B, and FIG. 22C, the siphoning device 434 includes a high pressure pump inlet 435 and a siphon inlet 437 that lead to a combined outlet 439. The pump inlet 435 may be fluidly connected to, for example, a spigot or other high pressure supply line such as line 450. The siphon inlet 437 may be connected to the collection tank 430 via the siphon inlet line 452. The pump inlet 435 may be substantially surrounded by the siphon inlet 437 as best illustrated in FIG. 22B. One or more check valves 441 may be provided within the siphon inlet 437. A valve 443 may be provided for altering the amount of fluid from pump inlet 435. A second valve may be provided for altering the amount of fluid from the siphon inlet 437. The pump inlet 435 and siphon inlet 437 may be in a generally parallel orientation.

Figure 23:
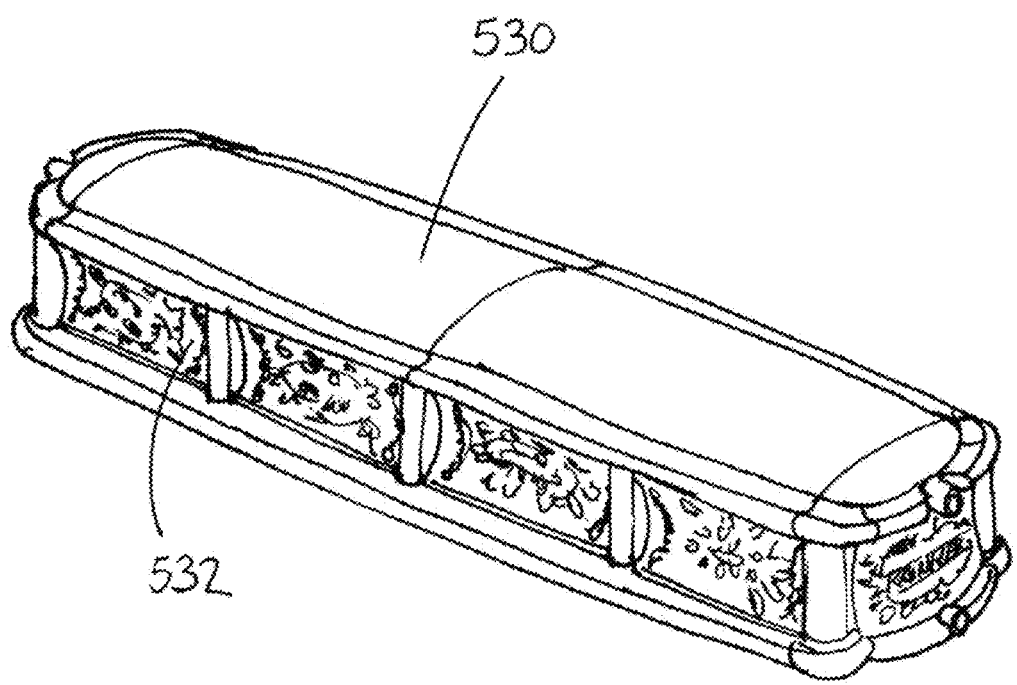
FIG. 23 is a perspective view of a collection tank for use with one or more collection systems disclosed herein according to one or more embodiments of the presently disclosed subject matter.

An alternate embodiment of a collection tank is illustrated in FIG. 23 and generally designated 530. The tank 530 is generally rigid in nature and includes rigid sidewalls 532. The tank is configured such that it has a set of apertures on each end of the tank 530 consisting of an inlet 459 and an outlet 412, thus allowing multiple tanks 530 to be configured in sequence with each other thus allowing the system to be fully evacuated with one siphoning device 434.

Figure 24:
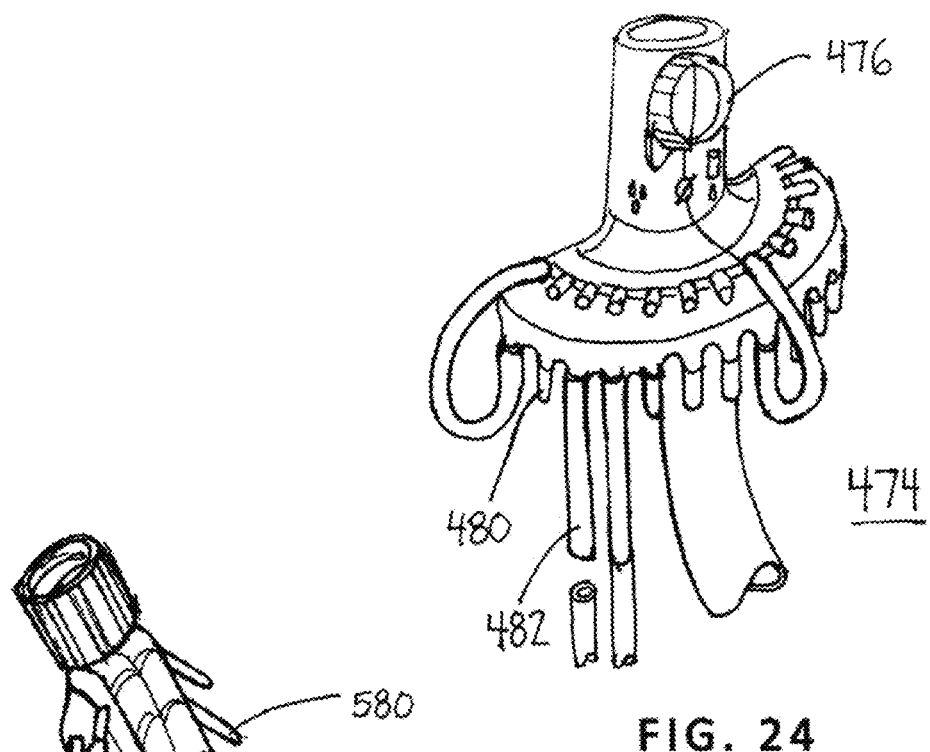
FIG. 24 is a perspective view of a distribution device for use with one or more collection systems disclosed herein according to one or more embodiments of the presently disclosed subject matter.
Figure 25:
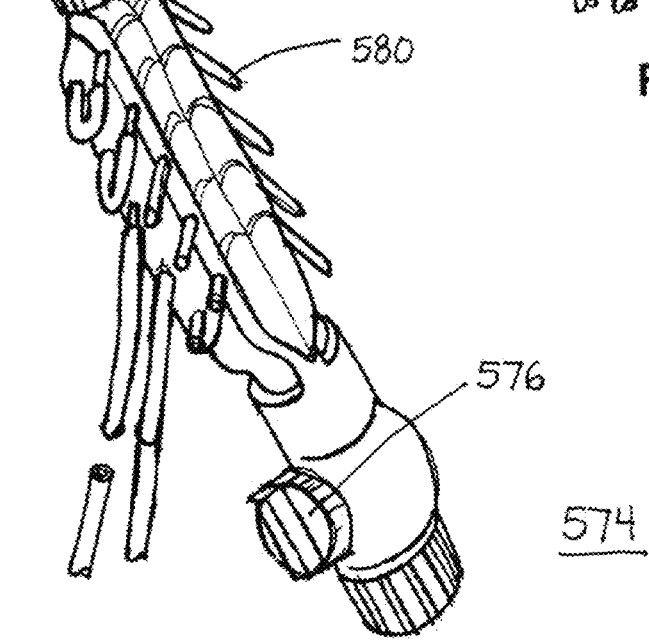
FIG. 25 is a perspective view of a distribution device for use for use with one or more collection systems disclosed herein according to one or more embodiments of the presently disclosed subject matter.

Alternate embodiments of a water distribution device are illustrated in FIG. 23 and FIG. 24, in which water distribution device 474 is illustrated in FIG. 24 and water distribution device 574 is illustrated in FIG. 25. Water distribution device 474 includes a plurality of drip posts 480. Each drip post 480 may be sealably connected to a drip tube 482 that can deliver water to an area to be irrigated. Alternatively, each drip tube 482 may be detached from the drip post 480 and reattached to a corresponding solid post to prevent water from flowing therethrough. A valve 476 may regulate the flow of water into the water distribution device 474 such that the user may direct flow to drip tubes 482, to an attached garden hose or shut off all flow. Similarly, water distribution device 574 includes drip posts 580, drip tubes 582, and valve 576. Each of the water distribution devices 474 and 575 may be sealably attached to a water storage tank for drip irrigation or for downstream use of the siphoning device 434.

A collector system is illustrated in FIG. 26A and FIG. 26B and is generally designated 600. A collector device 610 is positioned within the downspout 2. The downspout 2 may include a bracket 8 that extends inwardly and is configured for receiving a portion of the housing 612 of the collector device 610. The collector device 610 includes one or more collection apertures 614. A flange 616 extends from the housing 612 and is configured for engaging and closing off one portion of the downspout 2 to thereby separate the downspout into a first portion 622 in which rainwater is collected and a second portion 624 in which rainwater continues flowing through the downspout. An outlet fitting 626 is connected to the first portion 622 at a bottom portion of the collector device 610 and transfers collected water through to the outlet line 426 that may then be transferred to any of the collection and/or storage tanks described herein.

Figure 27A:
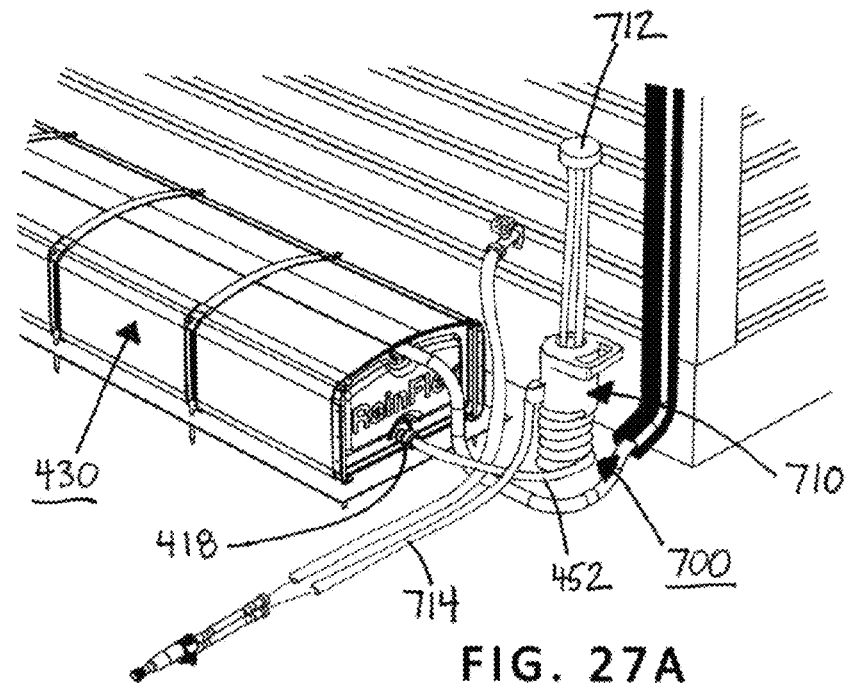
FIG. 27A is a perspective view of a collection system according to one or more embodiments of the presently disclosed subject matter.
Figure 27B:
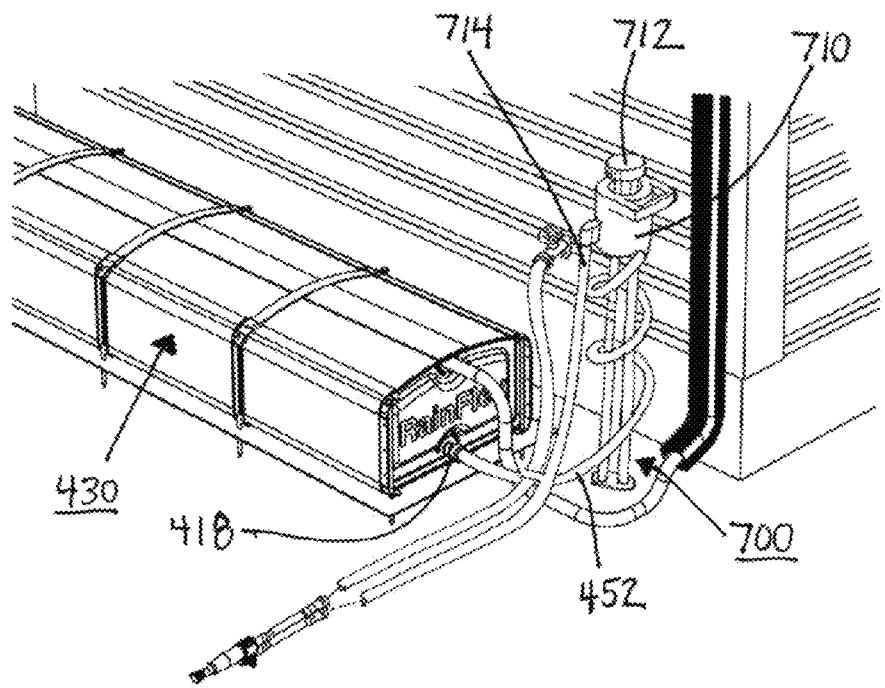
FIG. 27B is a perspective view of a collection system according to one or more embodiments of the presently disclosed subject matter.

A priming system is illustrated in FIG. 27A and FIG. 27B as 700. The priming system 700 is shown in a first collecting position in FIG. 27A in which a priming tank 710 is shown resting at a level at or below the tank 430 volume. As illustrated in FIG. 27A, outlet line 452 of the tank 430 is in fluid communication with the priming tank 710. Therefore, the priming tank 710 fills with fluid as the water level rises in the tank 430 as it is supplied by outlet hose 426. The priming tank 710 may be configured for slideable movement about support rods 712, or may be configured for any other translatable up and down movement. An outlet line 714 allows flow of fluid from the priming tank to a desired outlet point. As illustrated in FIG. 27B, when the priming tank 710 is elevated and fixed in said elevated position the fluid within priming tank 710 has a higher pressure than fluid at ground level and acts to prime the flow of fluid toward the outlet. A check valve 418 is also employed between the priming tank 710 and the tank 430 to prevent fluid from flowing back into the tank 430 when translated to the elevated position. After the fluid in the system is evacuated the user then returns the priming tank to its lower position shown in FIG. 27A to allow it to be filled for use again.

Figure 28A:
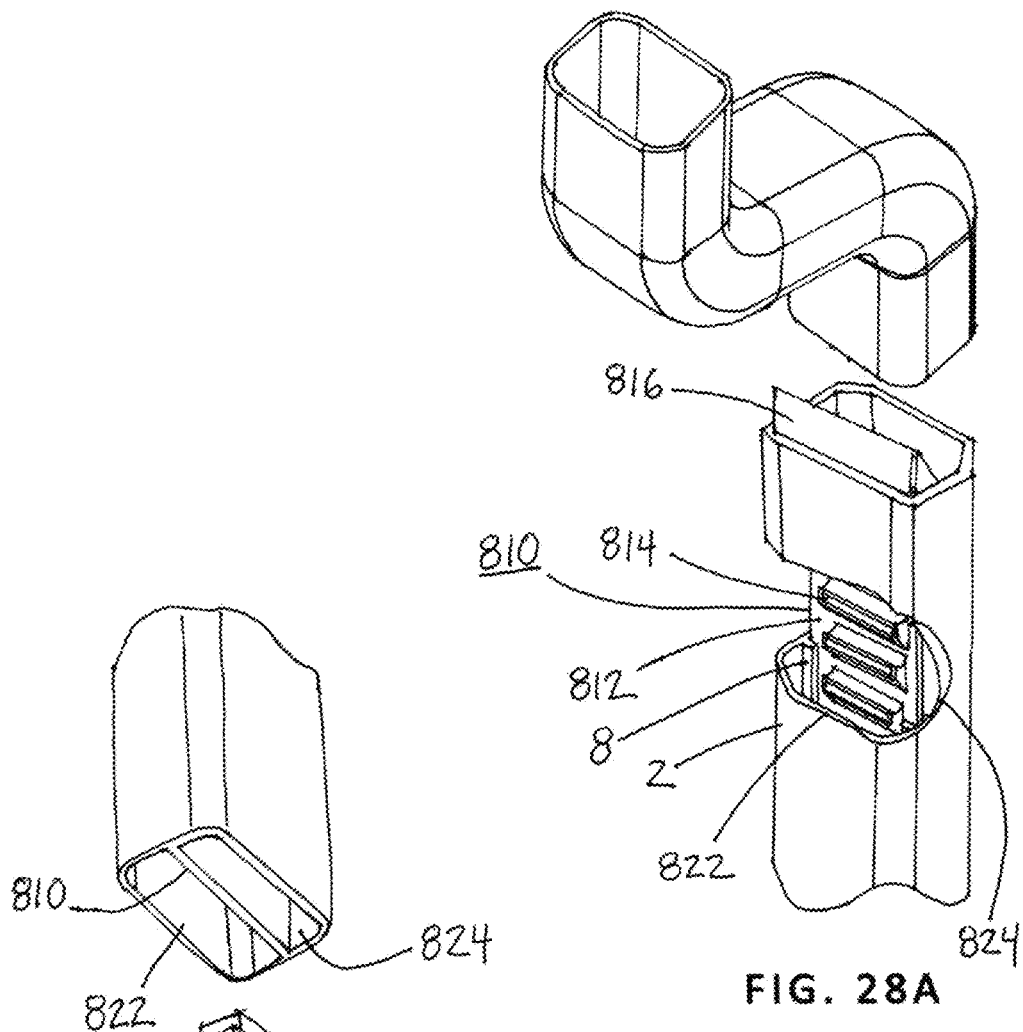
FIG. 28A is a partial, sectional view of a collector device for use with for use with one or more collection systems disclosed herein according to one or more embodiments of the presently disclosed subject matter.
Figure 28B:
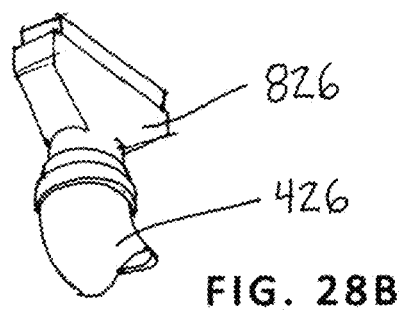
FIG. 28B is a perspective view of a collector device for use with for use with one or more collection systems disclosed herein according to one or more embodiments of the presently disclosed subject matter.

An alternative embodiment of a collection system is illustrated in FIG. 28A and FIG. 28B. A collector device 810 is positioned in the gutter system such that it replaces the long straight section of a standard downspout. The downspout 2 may include a bracket 8 that extends inwardly and is configured for receiving a portion of the housing 812 of the collector device 810. The collector device 810 includes one or more collection apertures 814. The collector device 810 includes an integral interior dividing wall separating the downspout longitudinally into a first portion 822 in which rainwater is collected and a second portion 824 in which rainwater continues flowing through the downspout. The dividing wall contains one or more apertures for translating fluid into the said first portion for collection. The apertures are configured such that they allow fluid but restrict debris from entering. An outlet fitting 826 is connected to the first portion 822 at a bottom portion of the collector device 810 and transfers collected water through to the outlet line 426 that may then be transferred to any of the collection and/or storage tanks described herein.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A device for use with a downspout of a rain gutter assembly, the downspout having a downspout inlet at a top portion thereof and a downspout outlet at a bottom portion thereof, the device comprising:
    a housing for being received in a first portion of the downspout inlet such that a second portion of the downspout inlet allows flow of uncollected water therethrough, the housing defining:
    at least one collection aperture on a surface thereof for allowing flow of collected water therethrough;
    a collection chamber in fluid communication with the collection aperture for containing the collected water; and
    a drain outlet in fluid communication with the collection chamber for allowing flow of collected water therethrough; and
    a drain line extending through the downspout and in fluid communication with the drain outlet and a storage tank for storing collected water, the drain line being sufficiently rigid to maintain the position of the device within the downspout.

2. The device according to claim 1, wherein the device can be positioned within the downspout by insertion into a bottom opening and being translated by movement within the downspout.

3. The device according to claim 1, wherein the at least one laterally extending collection aperture defines a ramp portion upstream thereof that angles away from the longitudinally extending wall toward the collection aperture for allowing water to follow the surface due to water surface tension whereby debris continues flowing through the downspout without entering the collection aperture.

4. The device according to claim 1, wherein the drain line is in sealed fluid communication with the drain outlet and the storage tank.

5. The device according to claim 4, further comprising a water powered siphoning device in sealed fluid communication with the storage tank for siphon pumping fluids therefrom.

6. The device according to claim 5, further including a valve device being in sealed fluid communication with the siphoning device, the storage tank, and an external water supply, the valve having a first inlet for supplying pressurized external water supply, a second inlet sealably connected to the storage tank, a first outlet for the external water supply, and a second outlet, wherein the second outlet comprises a selectively engageable valve for switching between the storage tank and the external water supply.

7. The device according to claim 1, wherein the housing defines one or more sections flexibly connected to one another such that the device can be translated within non-linear portions of the downspout.

8. The device according to claim 1, wherein the housing defines one or more sections pivotally connected to one another such that the device can be translated within non-linear portions of the downspout.

9. The device according to claim 1, wherein the housing is flexible such that the device can be translated within non-linear portions of the downspout.

10. The device according to claim 1, further including a bracket for extending across the downspout inlet to support the device in the downspout or for engaging about a seam of adjacent downspout sections.

11. The device of claim 1, wherein the storage tank has at least two inlets and at least two outlets thereby allowing multiple storage tanks to be in fluid communication with each other.

12. The device of claim 1, wherein the storage tank includes a buoyant material on a top portion thereof for maintaining the top portion in a spaced-apart relationship to a ground surface when suspended by liquid.

13. The device of claim 1, further comprising:
    a siphon pump comprising a pressure inlet for providing pressured water from an external water supply and a siphon inlet in fluid communication with the storage tank.

14. The device of claim 13, further comprising:
    a siphon inlet line by which the siphon inlet of the siphon pump is in fluid communication with the storage tank; and
    a pressure line for providing pressured water from the external water supply to the pressure inlet of the siphon pump,
    wherein at least portions of the siphon inlet line and pressure line extend parallel to each other.

15. The system of claim 14, wherein the siphon pump includes a check valve for restricting flow from the siphon pump in the direction of the storage tank.

* * * * *